(12) United States Patent
Kasahara et al.

(10) Patent No.: US 10,531,068 B2
(45) Date of Patent: Jan. 7, 2020

(54) INFORMATION PROCESSING DEVICE, INFORMATION PROCESSING METHOD, AND THREE-DIMENSIONAL IMAGE DATA TRANSMISSION METHOD

(71) Applicant: Sony Corporation, Tokyo (JP)

(72) Inventors: Shunichi Kasahara, Kanagawa (JP); Takahito Migita, Tokyo (JP); Kei Takahashi, Tokyo (JP); Tomohiro Tsunoda, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 16/092,664

(22) PCT Filed: Mar. 13, 2017

(86) PCT No.: PCT/JP2017/010034
§ 371 (c)(1),
(2) Date: Oct. 10, 2018

(87) PCT Pub. No.: WO2017/187821
PCT Pub. Date: Nov. 2, 2017

(65) Prior Publication Data
US 2019/0208179 A1    Jul. 4, 2019

(30) Foreign Application Priority Data
Apr. 28, 2016   (JP) ................... 2016-090280

(51) Int. Cl.
*H04N 13/194*   (2018.01)
*G06T 3/00*     (2006.01)
(Continued)

(52) U.S. Cl.
CPC ............ *H04N 13/194* (2018.05); *G06T 3/00* (2013.01); *G06T 3/0087* (2013.01); *G06T 19/00* (2013.01);
(Continued)

(58) Field of Classification Search
None
See application file for complete search history.

(56) References Cited

U.S. PATENT DOCUMENTS

2004/0247173 A1   12/2004   Nielsen et al.
2015/0269785 A1*   9/2015   Bell ..................... G06T 19/003
                                                               345/427
(Continued)

FOREIGN PATENT DOCUMENTS

JP   2001195491 A   7/2001
JP   2003141562 A   5/2003
(Continued)

OTHER PUBLICATIONS

International Search Report corresponding to PCT/JP2017/010034, dated Jun. 13, 2017, 3 pgs.

*Primary Examiner* — Eileen M Adams
(74) *Attorney, Agent, or Firm* — Lerner, David, Littenberg, Krumholz & Mentlik, LLP

(57) ABSTRACT

An information processing device and an information processing method that perform a mapping process on a whole-sky video are provided.
A required data reduction amount and a required storage state of an image quality are determined on the basis of a circumstance of a video providing device side that captures the whole-sky video, a circumstance of a video reproducing device side that views the whole-sky video, a circumstance of a space that serves as a subject, a circumstance of a case in which a plurality of delivery destinations are present, a circumstance of a channel, and the like, a mapping method is adaptively switched over to a mapping method that matches the requirements, and the whole-sky video is transmitted. Furthermore, the whole-sky video is transmitted in a
(Continued)

transmission format containing information that indicates the mapping method so that a receiving side can decode the original whole-sky video.

13 Claims, 21 Drawing Sheets

(51) Int. Cl.
| | | |
|---|---|---|
| *G06T 19/00* | (2011.01) | |
| *H04N 21/218* | (2011.01) | |
| *H04N 21/2343* | (2011.01) | |
| *H04N 21/422* | (2011.01) | |
| *H04N 21/4223* | (2011.01) | |
| *H04N 21/81* | (2011.01) | |
| *H04N 13/172* | (2018.01) | |
| *H04N 13/167* | (2018.01) | |
| *H04N 13/111* | (2018.01) | |
| *H04N 5/232* | (2006.01) | |
| *H04N 21/2187* | (2011.01) | |

(52) U.S. Cl.
CPC ....... *H04N 5/23238* (2013.01); *H04N 13/111* (2018.05); *H04N 13/167* (2018.05); *H04N 13/172* (2018.05); *H04N 21/218* (2013.01); *H04N 21/2343* (2013.01); *H04N 21/4223* (2013.01); *H04N 21/42201* (2013.01); *H04N 21/816* (2013.01); *H04N 21/2187* (2013.01)

(56) References Cited

U.S. PATENT DOCUMENTS

| | | | |
|---|---|---|---|
| 2016/0065947 A1* | 3/2016 | Cole | H04N 19/597 |
| | | | 348/43 |
| 2016/0379419 A1* | 12/2016 | Khalili | G06T 19/20 |
| | | | 345/419 |
| 2017/0019504 A1 | 1/2017 | Ota et al. | |

FOREIGN PATENT DOCUMENTS

| | | |
|---|---|---|
| JP | 2005056295 A | 3/2005 |
| JP | 2006180022 A | 7/2006 |
| WO | 2015/122052 A1 | 8/2015 |

\* cited by examiner

VIDEO VIEWING SYSTEM 200

VIDEO VIEWING SYSTEM 400

FIG.23

[imageStreaming data(H264) : mapping data (UV mapping)]

[texture, vertex, UV]

INFORMATION PROCESSING DEVICE, INFORMATION PROCESSING METHOD, AND THREE-DIMENSIONAL IMAGE DATA TRANSMISSION METHOD

CROSS-REFERENCE TO RELATED APPLICATIONS

This application is a national phase entry under 35 U.S.C. § 371 of International Application No. PCT/JP2017/010034 filed Mar. 13, 2017, which claims the priority from Japanese Patent Application No. 2016-090280 filed in the Japanese Patent Office on Apr. 28, 2016, the entire contents of which are hereby incorporated by reference.

TECHNICAL FIELD

The technique disclosed in the present specification relates to an information processing device and an information processing method for coding video information and to a transmission method, and particularly relates to an information processing device and an information processing method for performing a mapping process on a whole-sky video for coding and compression and to a three-dimensional image data transmission method.

BACKGROUND ART

Normally, a customer makes a private view (preview) of a property at a time of the purchase or the lease contract of real estate such as an apartment or a stand-alone house. However, properties which the client wants to make a preview of are not necessarily concentrated on one location; thus, the client can make a preview of approximately only three to four properties a day and inefficiency problem remains.

For example, there is proposed a real estate property sales support system (refer to, for example, PTL 1) configured such that a first database storing three-dimensional shape data regarding a real estate property and a second database storing interior information associated with the real estate property as three-dimensional shape data are disposed so that the first database and the second database are browsable through the Internet, and such that an inside of the real estate property is displayed as a virtual space on the basis of the three-dimensional shape data read from the first and second databases. According to this system, the interior of a living space based on the three-dimensional shape data regarding the living space and that regarding interior information associated with the living space can be displayed to a purchaser of the property as a virtual space.

CITATION LIST

Patent Literature

[PTL 1]
  JP 2001-195491A
[PTL 2]
  JP 2003-141562A

SUMMARY

Technical Problem

An object of the technique disclosed in the present specification is to provide a superior information processing device and a superior information processing method that can appropriately perform a mapping process on a whole-sky video, and a superior three-dimensional image data transmission method.

Solution to Problem

The technique disclosed in the present specification has been achieved in the light of the above problem and a first aspect thereof is
an information processing device including:
  a receiving section that receives a three-dimensional image;
  a storage section that retains a three-dimensional model for mapping the three-dimensional image onto a two-dimensional image;
  a transmission section that transmits the two-dimensional image; and
  a control section, in which
  the control section determines the three-dimensional model to be used on the basis of a user's instruction or a surrounding environment, maps the three-dimensional image onto the two-dimensional image on the basis of the determined three-dimensional model, and transmits the two-dimensional image to the transmission section.

According to a second aspect of the technique disclosed in the present specification, the receiving section of the information processing device according to the first aspect is configured to receive a whole-sky video as the three-dimensional image, and the control section thereof is configured to exercise switchover control over a shape onto which the whole-sky video is mapped among a plurality of three-dimensional models including at least one of a cylinder, a cube, a quadrangular pyramid, or a shape of a subject.

According to a third aspect of the technique disclosed in the present specification, the receiving section of the information processing device according to the second aspect is configured to receive a first signal from a first device that captures the whole-sky video, and the control section thereof is configured to exercise the switchover control on the basis of information contained in the first signal.

According to a fourth aspect of the technique disclosed in the present specification, the control section of the information processing device according to the third aspect is configured to exercise the switchover control in response to a user's instruction contained in the first signal.

According to a fifth aspect of the technique disclosed in the present specification, the control section of the information processing device according to the third aspect is configured to exercise the switchover control in response to information indicating a circumstance during capturing and contained in the first signal.

According to a sixth aspect of the technique disclosed in the present specification, the control section of the information processing device according to the third aspect is configured to switch over to mapping using the quadrangular pyramid with a bottom surface thereof facing the subject on the basis of information associated with the subject and contained in the first signal.

According to a seventh aspect of the technique disclosed in the present specification, the transmission section of the information processing device according to the second aspect is configured to transmit the two-dimensional image onto which the whole-sky video is mapped to a second device and the control section thereof is configured to exercise the switchover control on the basis of information contained in a second signal received from the second device.

According to an eighth aspect of the technique disclosed in the present specification, the control section of the information processing device according to the seventh aspect is configured to exercise the switchover control on the basis of information associated with the subject and contained in the second signal.

According to a ninth aspect of the technique disclosed in the present specification, the control section of the information processing device according to the eighth aspect is configured to switch over to mapping using the quadrangular pyramid with a bottom surface thereof facing the subject.

According to a tenth aspect of the technique disclosed in the present specification, the control section of the information processing device according to the seventh aspect is configured to switch over to mapping using the quadrangular pyramid with a bottom surface thereof facing a direction of a visual line on the basis of visual line information contained in the second signal.

According to an eleventh aspect of the technique disclosed in the present specification, the control section of the information processing device according to the seventh aspect is configured to exercise the switchover control in response to a user's instruction contained in the second signal.

According to a twelfth aspect of the technique disclosed in the present specification, the transmission section of the information processing device according to the second aspect is configured to transmit the whole-sky video to a plurality of second devices and the control section thereof is configured to exercise the switchover control on the basis of visual line information contained in the second signal received from each of the plurality of second devices.

According to a thirteenth aspect of the technique disclosed in the present specification, the control section of the information processing device according to the twelfth aspect is configured to exercise control to unicast the two-dimensional image onto which the whole-sky video is mapped using the quadrangular pyramid with a bottom surface thereof facing a direction of a visual line of each of the plurality of second devices to each of the plurality of second devices.

According to a fourteenth aspect of the technique disclosed in the present specification, the control section of the information processing device according to the twelfth aspect is configured to exercise control to multicast the two-dimensional image onto which the whole-sky video is mapped using the quadrangular pyramid with a bottom surface thereof facing a region including a majority of a visual line.

According to a fifteenth aspect of the technique disclosed in the present specification, the information processing device according to the second aspect further includes a monitoring section that monitors a circumstance of a channel for transmitting the whole-sky video. In addition, the control section is configured to exercise the switchover control on the basis of the circumstance of the channel.

According to a sixteenth aspect of the technique disclosed in the present specification, the control section of the information processing device according to the first aspect is configured to exercise control over the transmission section to transmit the two-dimensional image in a transmission format containing information for identifying the three-dimensional model used in mapping.

Moreover, a seventeenth aspect of the technique disclosed in the present specification is an information processing method including:

a receiving step of receiving a three-dimensional image;

a storage step of retaining in a storage section a three-dimensional model for mapping the three-dimensional image onto a two-dimensional image;

a transmission step of transmitting the two-dimensional image; and a control step, in which the control step includes determining the three-dimensional model to be used on the basis of a user's instruction or a surrounding environment, and mapping the three-dimensional image onto the two-dimensional image on the basis of the determined three-dimensional model, and the transmission step includes transmitting the two-dimensional image.

Furthermore, an eighteenth aspect of the technique disclosed in the present specification is a three-dimensional image data transmission method including:

a step of incorporating two-dimensional map image data obtained by mapping the three-dimensional image onto a two-dimensional image on the basis of a three-dimensional model and attached data for identifying the three-dimensional model used in the mapping into one dataset; and a step of transmitting the dataset.

Advantageous Effects of Invention

According to the technique disclosed in the present specification, it is possible to provide a superior information processing device and a superior information processing method that can appropriately perform a mapping process on a whole-sky video, and a superior three-dimensional image data transmission method.

It is noted that effects described in the present specification are given as an example only, and the effects of the present invention are not limited to these effects. Furthermore, the present invention often exhibits additional effects other than the above effects.

Still other objects, features, and advantages of the technique disclosed in the present specification will be readily apparent from more detailed description based on embodiments to be described later and accompanying drawings.

BRIEF DESCRIPTION OF DRAWINGS

FIG. 23 is a diagram illustrating an example of syntax of the compressed and coded whole-sky video.

DESCRIPTION OF EMBODIMENTS

Embodiments of the technique disclosed in the present specification will be described in detail with reference to the drawings.

A. Outline of System

A-1. System Configuration

Figure 1:
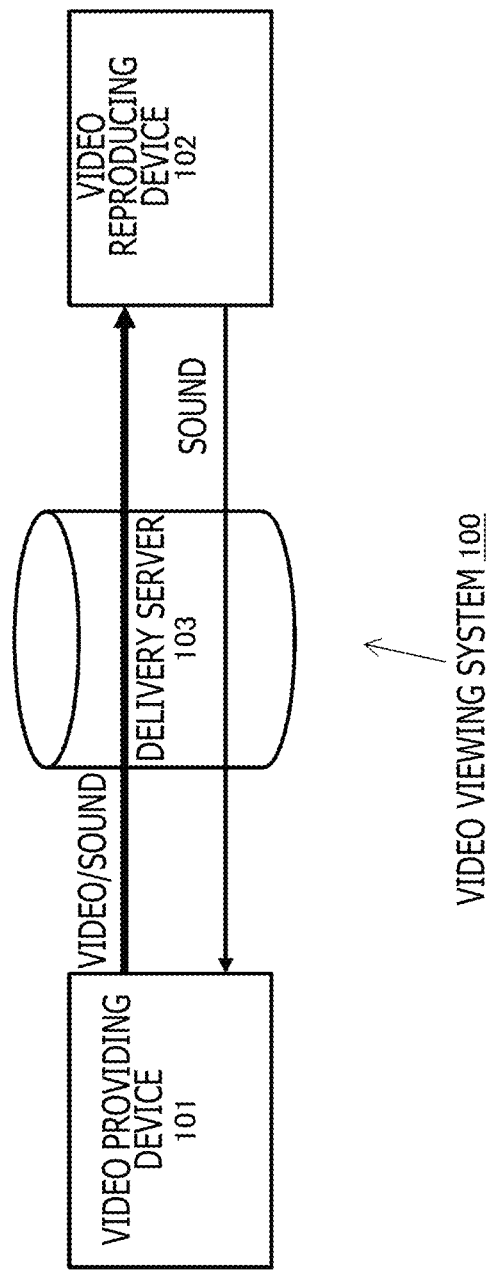
FIG. 1 is a diagram schematically illustrating an example of a configuration of a video viewing system 100 for viewing a video.

FIG. 1 is a diagram schematically illustrating an example of a configuration of a video viewing system 100 for viewing a video. A video viewing system 100 includes one video providing device 101 that provides a video and one video reproducing device 102 that reproduces the video, and configures a one-to-one network topology. The video providing device 101 and the video reproducing device 102 are interconnected to each other via, for example, wireless or wired LAN (Local Area Network) or a wide area network such as the Internet.

The video providing device 101 is an information terminal operated by, for example, a user (a previewer of a real estate property, a salesperson of a real estate company, or the like) present at the real estate property (on the spot). Alternatively, the video providing device 101 may be a fixed point camera installed on the spot or a camera mounted in a robot autonomously acting on the spot. Furthermore, the video reproducing device 102 is an information terminal operated by a user (for example, a customer under consideration of a purchase or a lease contract of real estate) who does not visit the spot but browses property information at a place (for example, a shop of the real estate company or a house of the user) apart from the spot.

The video providing device 101 includes an imaging section that captures a video (for example, a video from a viewpoint of the salesperson present on the spot of the real estate property) with an installation position of the video providing device 101 set as a viewpoint location, and transmits the captured video to the video reproducing device 102. For example, the imaging section may include one whole-sky camera. It is noted, however, that a visual field of a whole-sky video is not necessarily 360 degrees but a portion of the visual field may be missing (the same applies hereinafter).

In addition, the video providing device 101 further includes an audio input section such as a microphone, and may multiplex a sound that is collected on the spot on which the whole-sky video is captured with the video and transmit a multiplexed result to the video reproducing device 102. For example, the salesperson present on the spot of the real estate property may collect the sound of the salesperson for explaining a locational condition, a floor plan, and the like of the property and transmit the collected sound to the video reproducing device 102.

Moreover, the video providing device 101 may include a display section. The display section (or the video providing device 101 itself) is configured as, for example, a transmission head mounted display. The user present on the spot wears this head mounted display on the head, and photographs the spot or explains the property while appropriately referring to a video displayed in a see-through manner on the head mounted display.

The video reproducing device 102, on the other hand, includes a display section that displays the video received from the video providing device 101. The video reproducing device 102 (or the display section thereof) is configured as, for example, a head mounted display worn on the user's head for the user to view the video. For example, the video reproducing device 102 slices a video at a predetermined angle of view from a whole-sky video (a video obtained by photographing an interior of the real estate property) captured by the video providing device 101 and displays the sliced video. Alternatively, the video reproducing device 102 may be configured as a domed display and may display the entire whole-sky video captured at the installation position of the video providing device 101. As for details of the domed display, refer to, for example, a specification of JP 2015-245710A already assigned to the present applicant. In another alternative, the video reproducing device 102 may be an ordinary (or a large-screen) monitor/display.

Moreover, the video reproducing device 102 may include an audio output section such as a loudspeaker or headphones, and reproduce and output, along with the video, the sound (for example, the sound of the salesperson present on the spot of the real estate property for explaining the locational condition, the floor plan, and the like of the property) transmitted from the video providing device 101 while being multiplexed with the video.

In addition, the video reproducing device 102 may further include an audio input section such as a microphone and a user's audio instruction may be input to the audio input section. For example, a user of the video reproducing device 102 can input an audio-based instruction such as "I want to check a view from a balcony" or "let me have a look at a living room," and such an instruction is transmitted to the video providing device 101.

While the video providing device 101 and the video reproducing device 102 may establish a direct communication, it is assumed hereinafter that a communication is established therebetween via a delivery server 103. The video providing device 101 temporarily transmits the whole-sky video captured on the spot to the delivery server 103. The delivery server 103 transmits either the whole-sky video or the video at the predetermined angle of view sliced from the whole-sky video to the video reproducing device 102. In addition, the delivery server 103 archives the video received from the video providing device 101.

The video viewing system 100 illustrated in FIG. 1 configures the one-to-one network topology with the one video providing device 101 and the one video reproducing device 102. For example, the video viewing system 100 corresponds to an implementation in which a user views a video captured by the one video providing device 101 installed in a specific property by the one video reproducing device 102 installed in the shop of the real estate company. The customer can view a real video of the property in a manner close to reality without taking the time to visit the spot, so that it is possible to realize an efficient preview and improve customer satisfaction.

Figure 2:
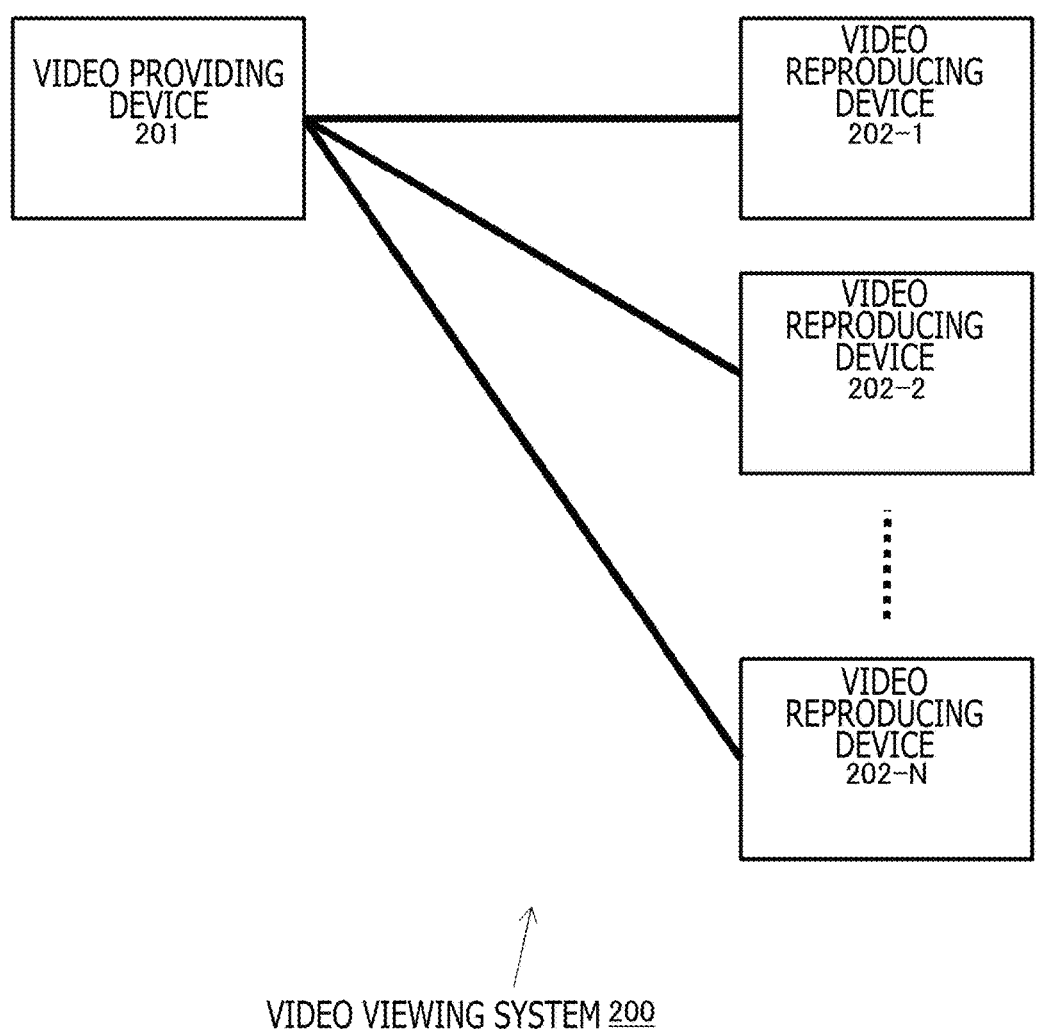
FIG. 2 is a diagram schematically illustrating an example of a configuration of a video viewing system 200 for viewing a video.
Figure 3:
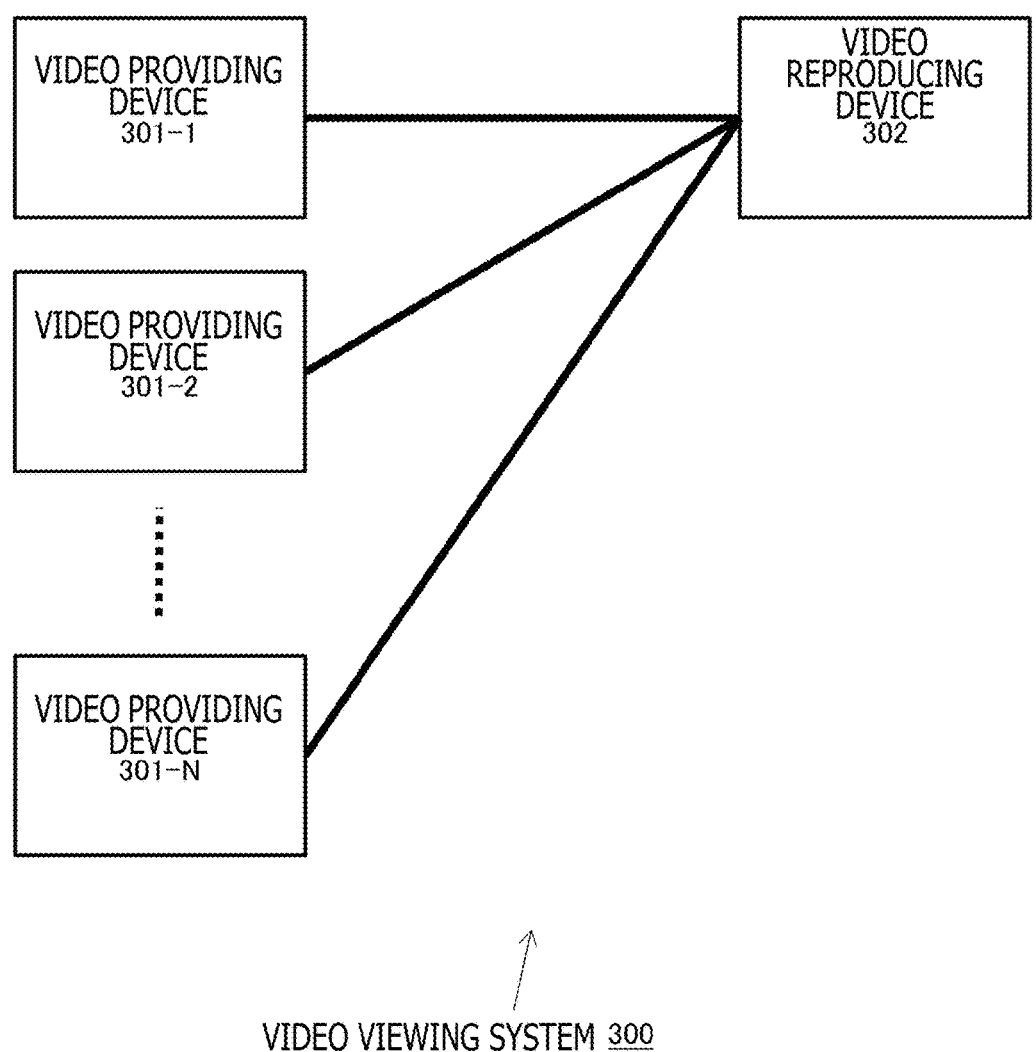
FIG. 3 is a diagram schematically illustrating an example of a configuration of a video viewing system 300 for viewing a video.
Figure 4:
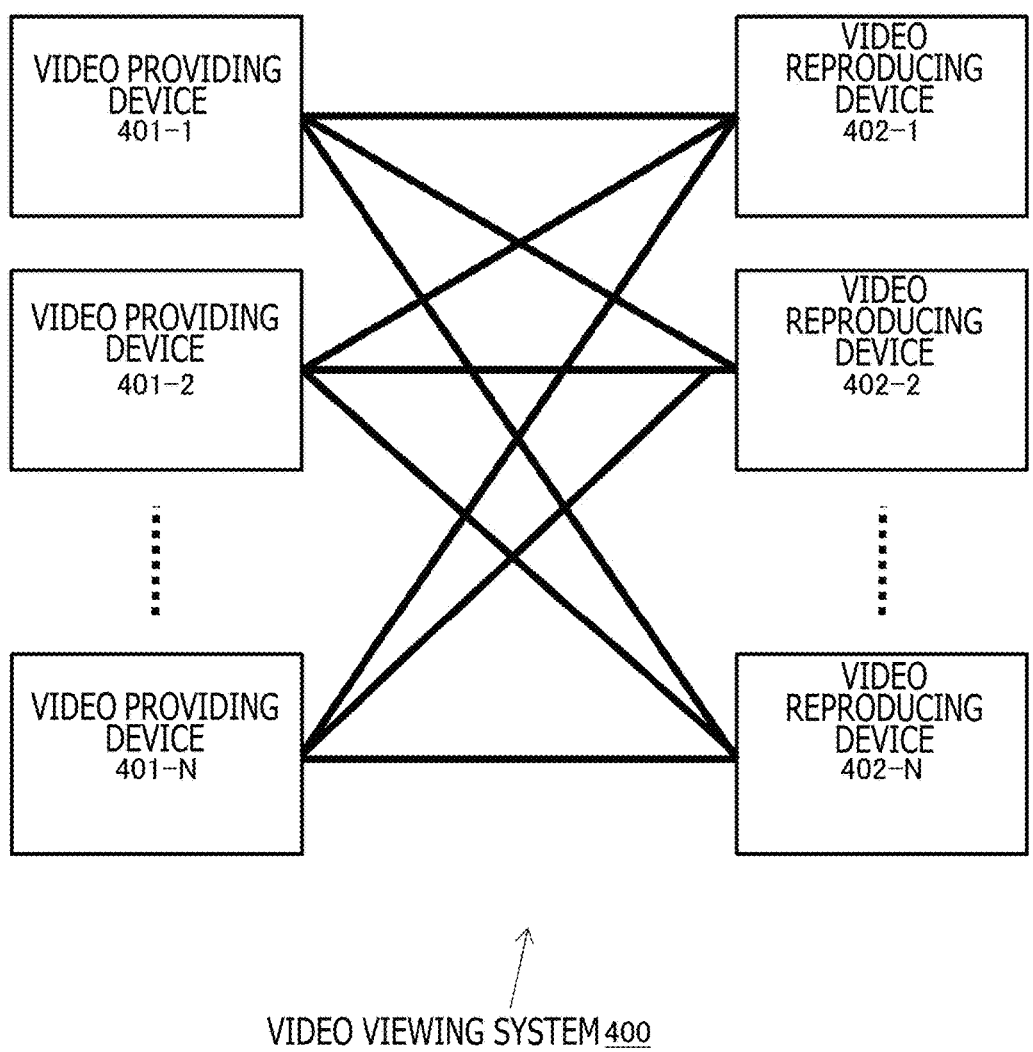
FIG. 4 is a diagram schematically illustrating an example of a configuration of a video viewing system 400 for viewing a video.

FIGS. 2 to 4, by contrast, illustrate modifications of the video viewing system 100 for viewing a whole-sky video. It is noted that, while the delivery server is omitted in each of the figures, it would be understood that the delivery server lies between the video providing device and the video reproducing device in each of the figures.

A video viewing system 200 illustrated in FIG. 2 configures a one-to-N network topology with one video providing device 201 and a plurality of (N) video reproducing devices 202-1, 202-2, . . . , and 202-N, and is configured such that a whole-sky video (the same video captured at the same viewpoint location in the same visual line direction) captured by the one video providing device 201 is viewed by each of the video reproducing devices 202-1, 202-2, . . . , and 202-N simultaneously. For example, the video viewing system 200 corresponds to an implementation in which customers view a video of a specific property captured by the one video providing device 201 installed in the property by the plurality of video reproducing devices 202-1, 202-2, . . . , and 202-N installed in shops of the real estate company (or a plurality of branches of the real estate company). A plurality of customers can share and view a real video of one property, so that it is possible to realize an efficient preview for the real estate company.

Furthermore, a video viewing system 300 illustrated in FIG. 3 configures an N-to-one network topology with a plurality of (N) video providing devices 301-1, 301-2, . . . , and 301-N and one video reproducing device 302, and is configured such that the one video reproducing device 302 selectively receives a video from any one of the video providing devices 301-1, 301-2, . . . , and 301-N located in different places and displays the selected video. It is assumed that the video reproducing device 302 can dynamically switch a video source over among the video providing devices 301-1, 301-2, . . . , and 301-N. When the video providing device 301 serving as the video source is switched over, a viewpoint location of the video reproduced (viewable) by the video reproducing device 302 is switched over (the viewpoint location is instantaneously moved to the installation position of the selected video providing device 301). It is also assumed that the video reproducing device 302 can instruct the selected video providing device 301 to switch a visual line direction. For example, the video viewing system 300 corresponds to an implementation in which a customer views videos from the plurality of video providing devices 301-1, 301-2, . . . , and 301-N installed in a plurality of respective properties while switching over the videos by the one video reproducing device 302 installed in the shop of the real estate company. Alternatively, an implementation in which a customer views videos from the plurality of video providing devices 301-1, 301-2, . . . , and 301-N installed in respective rooms of one real estate property while switching over the videos by the video reproducing device 302 may be supposed. The customer can view real videos of the properties at a stroke in a manner close to reality without taking the time to move to and visit the properties, so that it is possible to realize an efficient preview and improve customer satisfaction.

Moreover, a video viewing system 400 illustrated in FIG. 4 configures an N-to-N network topology with a plurality of (N) video providing devices 401-1, 401-2, . . . , and 401-N and a plurality of (N) video reproducing devices 402-1, 402-2, . . . , and 402-N. The N-to-N network topology can include the one-to-one network illustrated in FIG. 1, the one-to-N network illustrated in FIG. 2, and the N-to-1 network illustrated in FIG. 3. For example, the video viewing system 400 corresponds to an implementation in which customers view videos from the plurality of video providing devices 401-1, 401-2, . . . , and 401-N installed in a plurality of respective properties while switching over the videos by the plurality of video reproducing devices 402-1, 402-2, . . . , and 402-N installed in the shops of the real estate company (or a plurality of branches of the real estate company). Each customer can view real videos of the properties at a stroke in a manner close to reality without taking the time to move to and visit the properties, so that it is possible to realize an efficient preview and improve customer satisfaction.

B. Device Configuration

B-1. Configuration of Video Providing Device

Figure 5:
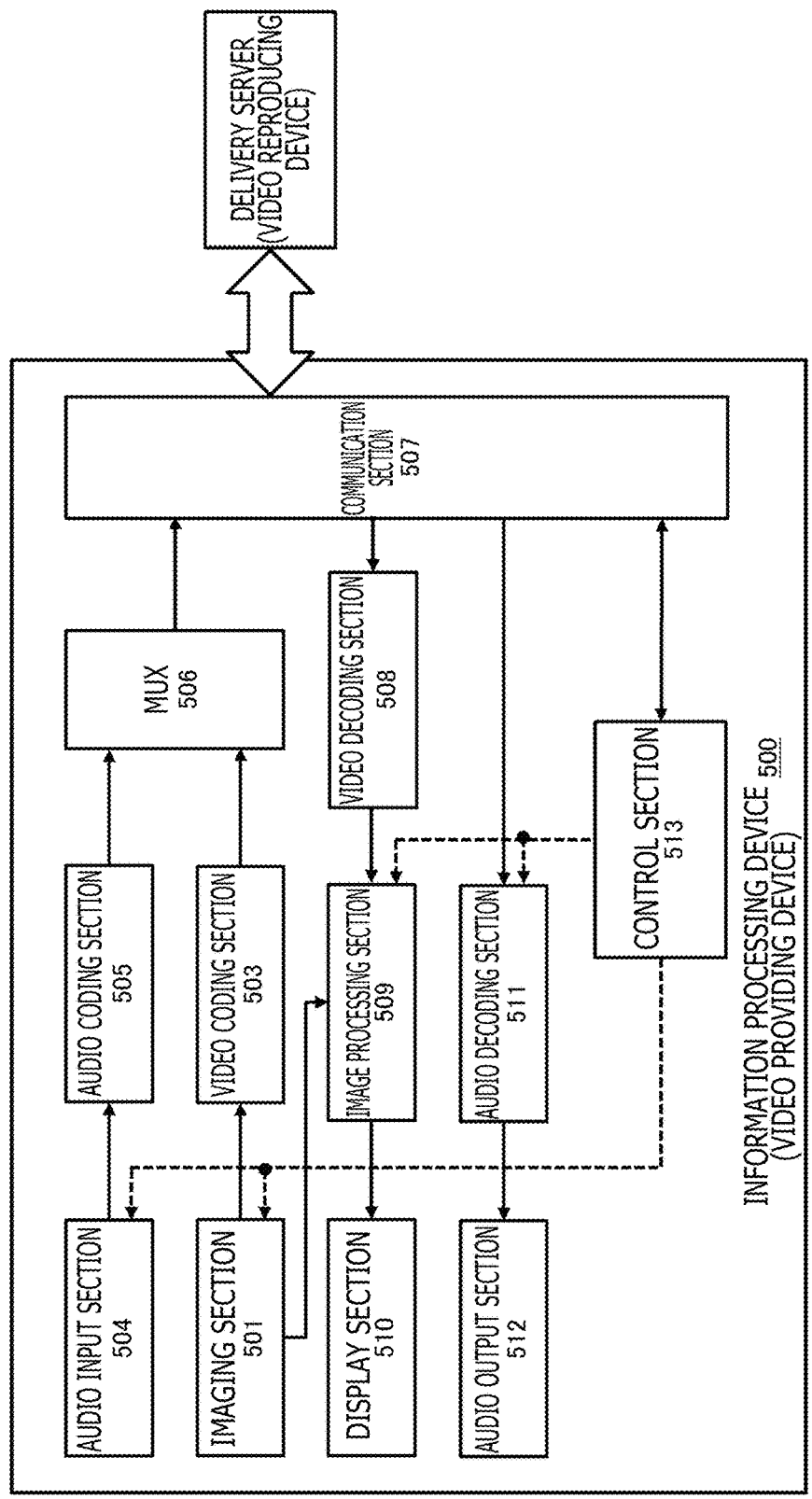
FIG. 5 is a diagram schematically illustrating an example of a functional configuration of an information processing device 500 capable of functioning as a video providing device.

FIG. 5 schematically illustrates a functional configuration of an information processing device 500 capable of functioning as the video providing device in each of the video viewing systems 100 to 400. The information processing device 500 illustrated in the figure includes an imaging section 501, a video coding section 503, an audio input section 504, an audio coding section 505, a multiplexing section (MUX) 506, a communication section 507, a video decoding section 508, an image processing section 509, a display section 510, an audio decoding section 511, an audio output section 512, and a control section 513. Each of the sections 501 to 513 will be described below.

The imaging section 501 includes a single-lens reflex camera (including a wide angle camera and a fish-eye lens camera), a twin-lens stereo camera, a multiple-lens whole-sky camera, or the like. Using the stereo camera makes it possible to add a sense of depth to a video. The imaging section 501 images a surrounding area of a place where the information processing device 500 is installed with the installation place assumed as a viewpoint location. The video coding section 503 performs a coding process on a video signal picked up by the imaging section 501.

The audio input section 504 includes, for example, a small-sized microphone or a stereo microphone, and arranging the audio input section 504 along with the imaging section 501 makes it possible to collect a sound of a spot on which a whole-sky video is captured. Using the stereo microphone enables a reproducing side (that is, the video reproducing device) to stereoscopically reconstruct the sound during sound collection. The audio coding section 505 performs a coding process on an audio signal input to the audio input section 504.

The multiplexing section 506 multiplexes a coded video signal and a coded audio signal coded by the video coding section 503 and the audio coding section 505, respectively, with each other, and forms a multiplexed signal into a signal format (packet) for transmission to the video reproducing device by way of the delivery server.

The display section 510 (or the overall video providing device 500) is configured as, for example, a transmission head mounted display. Alternatively, the display section 510 (or the overall video providing device 500) is configured as a camera-equipped portable information terminal such as a smartphone or a tablet. The display section 510 displays a video in such a manner that the video is superimposed on a field of view of a user who images a property on the spot. The video decoding section 508 performs a decoding process on an archived video received from, for example, the delivery server. The image processing section 509 performs processes such as image recognition of the image picked up by the imaging section 501 or the video decoded by the video decoding section 508, and generates a video displayed on the display section 510. The display section 510 displays guidance information such as a destination or a moving path to a user.

The audio decoding section 511 performs a decoding process on the coded audio signal received from, for example, the video reproducing device. The audio output section 512 outputs a decoded baseband audio signal as a sound. For example, an audio-based instruction such as "I want to check a view from a balcony" or "let me have a look at a living room" from a user of the video reproducing device is output as a sound on the spot.

The communication section 507 establishes a two-way communication, starting with transmission of videos and sounds, with the video reproducing device. It is noted, however, that the communication of the communication section 507 with the video reproducing device is established via the delivery server (described above). It is assumed that the communication section 507 establishes a two-way communication with the video reproducing device, the delivery server, or other external devices via, for example, a wireless or wired LAN or a wide area network such as the Internet.

The control section 513 exercises centralized control over operations of the sections 501 to 512. For example, the control section 513 performs processes for realizing a real-time communication with the video reproducing device (or a viewing group) that is the video transmission destination, and processes on the video displayed on the display section 510 for the user (who photographs the property on the spot). In addition, the control section 513 controls the constituent elements of the information processing device 500 to perform processes such as one for turning on/off an imaging operation or an audio input operation, a mosaic or masking process on the captured video, and a modulation process on the input sound in order to limit a range of information provided in response to attribute information associated with the video reproducing device (or the viewing group) that is the video transmission destination.

B-2. Configuration of Video Reproducing Device

Figure 6:
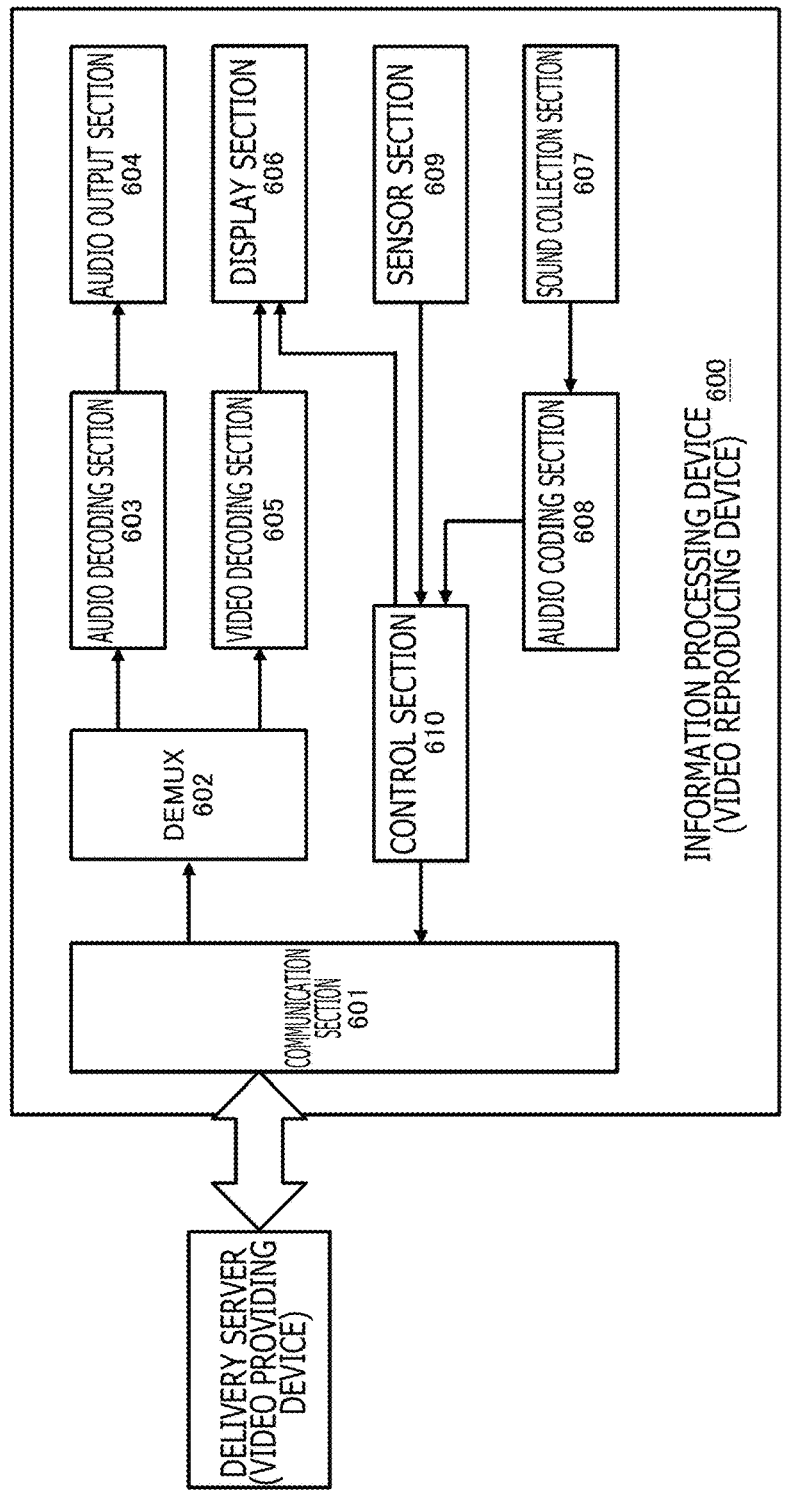
FIG. 6 is a diagram schematically illustrating an example of a functional configuration of an information processing device 600 capable of functioning as a video reproducing device.

FIG. 6 schematically illustrates a functional configuration of an information processing device 600 capable of functioning as the video reproducing device in each of the video viewing systems 100 to 400. The information processing device 600 illustrated in the figure includes a communication section 601, a demultiplexing section (DMUX) 602, an audio decoding section 603, an audio output section 604, a video decoding section 605, a display section 606, a sound collection section 607, an audio coding section 608, a sensor section 609, and a control section 610. Each of the sections 601 to 610 will be described below.

The communication section 601 establishes a two-way communication, starting with transmission of videos and sounds, with the video providing device. In addition, the information processing device 600 establishes a communication with the delivery server (described above) via the communication section 601 as needed. It is assumed that the communication section 601 establishes a two-way communication with the video providing device, the delivery server, or other external devices via, for example, the wireless or wired LAN or the wide area network such as the Internet.

For example, a video or audio transmission start request is transmitted from the communication section 601 to the video providing device installed in a location where the user desires to view the video (for example, the real estate property which the user desires to make a preview of). In addition, the communication section 601 receives a transmission signal formed into a predetermined signal format (packet) and transmitted from the video providing device. Furthermore, when the user desires to view the video received from a certain video providing device at the viewpoint location of the video providing device in a different visual line direction while the video is being displayed (that is, the user is viewing the video), the communication section 601 transmits a visual line direction change request. Moreover, when the user desires to switch the video over to a video from another video providing device, the communication section 601 transmits a transmission stop request to the video providing device that is being receiving the video and the sound and transmits a transmission start request to the video providing device that is a destination.

The demultiplexing section 602 demultiplexes the multiplexed signal transmitted from the video providing device into the coded video signal and the coded audio signal, and distributes the coded audio signal and the coded video signal to the audio decoding section 603 and the video decoding section 605, respectively.

The audio decoding section 603 decodes the coded audio signal to generate a baseband audio signal and outputs the baseband audio signal from the audio output section 604 as a sound. The audio output section 604 includes a monaural loudspeaker, a stereo loudspeaker, a multichannel loudspeaker, or the like.

The video decoding section 605 decodes the coded video signal to generate a baseband video signal, and displays the video captured by the video providing device that is the source on the display section 606. The display section 606 (or a main body of the information processing device 600) includes, for example, a head mounted display, a domed display, or a large-screen (or normal) monitor/display.

The sound collection section 607 includes, for example, a small-sized microphone, a stereo microphone, or the like, and collects a user's sound or the like. The audio coding section 608 performs a coding process on an audio signal input to the sound collection section 607 and outputs a coded audio signal to the control section 610. The user's sound may be an impression or an admiration with respect to the video displayed on the display section 606 or an audio instruction (for example, to change the visual line direction of the whole-sky video) to the control section 610 (or the video reproducing device).

The user of the video reproducing device can issue an audio-based instruction such as "I want to check a view from a balcony" or "let me have a look at a living room" while, for example, viewing the video of the real estate property which the user desires to make a preview of on the display section 606. Such a user's sound is collected by the sound collection section 607, coded by the audio coding section 608, and then transmitted from the communication section 601 to the video providing device.

The control section 610 controls output of the video and the sound received from the video providing device. In addition, the control section 610 exercises control over a screen of the display section 606 to display a UI, an OSD (On-Screen Display), or the like, and performs a process on an operation performed by the user (viewer) on the UI or the OSD.

The sensor section 609 measures a visual line direction, a head position, or a posture of the user (viewer viewing the video displayed on the screen of the display section 606). The sensor section 609 includes a combination of a plurality of sensor elements such as a gyro sensor, an acceleration sensor, and a geomagnetic sensor (for example, sensors including a three-axis gyro sensor, a three-axis acceleration sensor, and a three-axis geomagnetic sensor and capable of detecting nine axes in all). The sensor section 609 may be integrated with the main body of the information processing device 600 (the head mounted display or the like), or may be an accessory component external of the main body.

Actions such as the visual line direction, the head position, or the posture of the user detected by the sensor section 609 (or gesture actions using not only the head but also the body and hands and feet) often mean the operation on the UI or the OSD displayed on the display section 609 or mean the instruction of the angle of view of the video to be displayed on the display section 609 out of the whole-sky video. For example, user's shaking his/her head in horizontal and perpendicular directions (such as facing to the right or left, looking up, or looking down) can be handled as an instruction to change the visual line direction with respect to the whole-sky video. Furthermore, a user's action of tilting the body forward or backward may be handled as a camera zoom operation in the present visual line direction (zooming in if the body is tilted forward and zooming out if the body is tilted backward). A detection result of the sensor section 609 is then output to the control section 610.

The control section 610 transmits the instruction to change the visual line direction of viewing the whole-sky video that is being received via the communication section 601 on the basis of the user's visual line direction, the user's head shaking in the horizontal and perpendicular directions (such as facing to the right or left, looking up, or looking down), or a change in the posture, which are detected by the sensor section 609. In addition, the control section 610 transmits the user's audio instruction collected by the sound collection section 607 to the video providing device via the communication section 601 either as it is or after converting the audio instruction into text information or command information.

Furthermore, the control section 610 carries out a process on the video displayed on the display section 606 in response to a user's operation in a case in which the actions such as the visual line direction, the head, or the posture of the user (or gesture actions using not only the head but also the body and hands and feet) are the operation on the UI or the OSD on the screen.

It is noted that the information processing device 600 may further include well-known input devices such as a keyboard, a mouse, a touch panel, a joystick, or a game controller, which are not illustrated. The input device of any of these types may be used for an input operation on the UI or the OSD on the screen of the display section 606 or the instruction to move a capture position of the whole-sky video or change or switch over the visual line for the whole-sky video.

C. Viewing of Archived Video

In Section A above, a mechanism for allowing the real video captured in realtime by the video providing device to be viewed by the video reproducing device has been mentioned. By contrast, there is an implementation in which the video captured by the video providing device is temporarily recorded in an external device (delivery server) and a video reproducing device side views an archived video from the external device.

There are various reasons for viewing the archived video. For example, there are cases in which a customer desires to check the property in a time zone different from that of viewing time such as a case in which the customer makes a preview of the property upon viewing an archived video of the property captured in the daytime in advance because the customer is busy in the daytime and can visit the shop of the real estate company only after nightfall and conversely a case in which the customer who has viewed the real video in the daytime desires to check a night view of the property. There is also a case in which the customer desires to view the video of the property captured in a different environment such as a different weather, for example, a rainy weather from that during viewing. Further to the cases, there is a case in which the customer desires to confirm a state of the property in a different season in the same time zone. There is further a case in which access concentration occurs on a specific video providing device from many video reproducing devices due to a popular property or the like and resultant limitation on a transmission band prohibits transmission of the real video to all the video reproducing devices.

Figure 7:
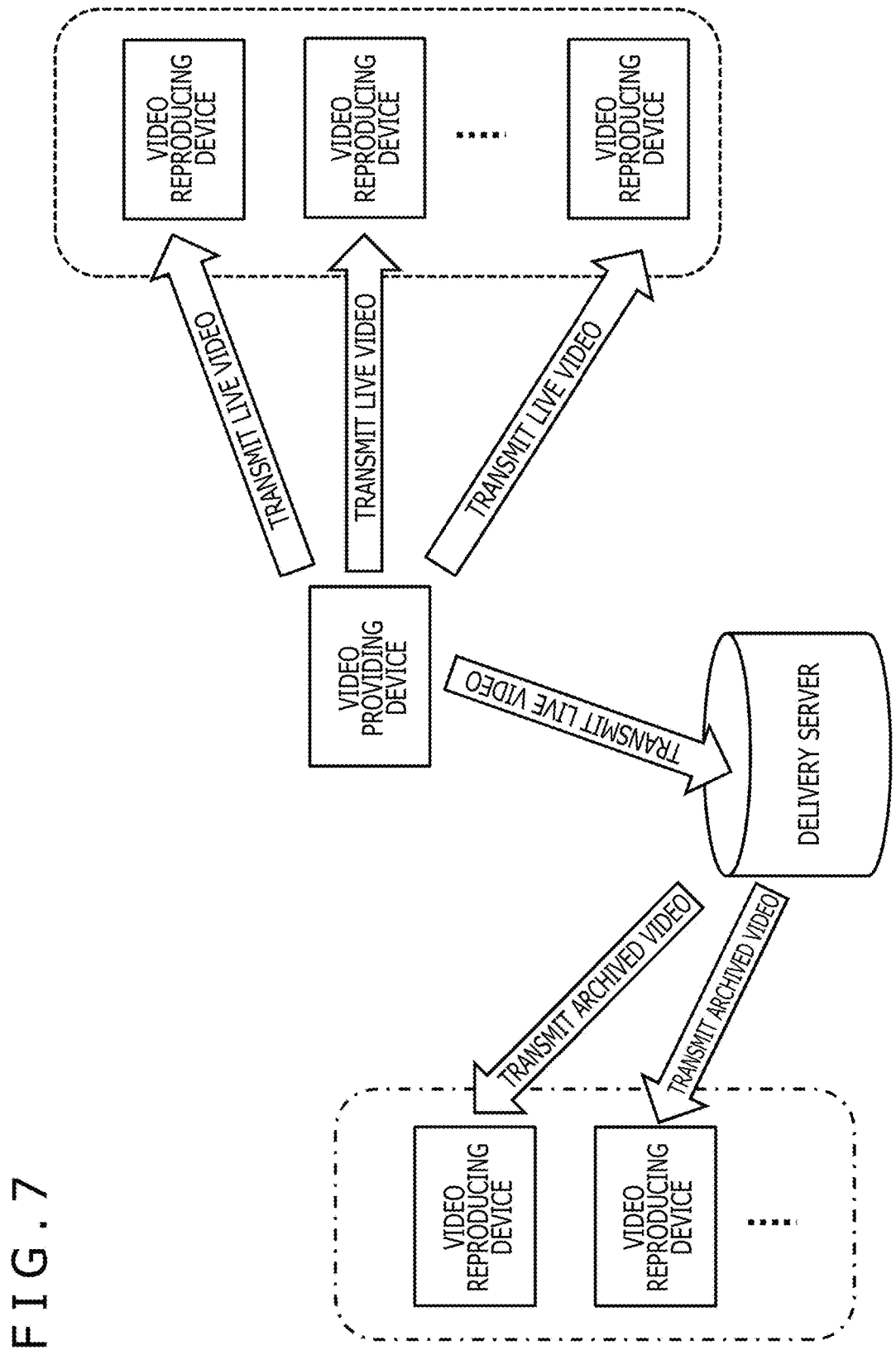
FIG. 7 is an illustrative diagram of a mechanism for viewing an archived video.

FIG. 7 illustrates a mechanism for not directly transmitting the realtime video from the video providing device to the video reproducing device but delivering the archived video recorded in the external device.

The external device means herein, for example, the delivery server installed physically independently of the video providing device and recording the video. Leaving to the delivery server the delivery of the video to the video reproducing device expelled as an over-capacity device at time or in a time zone designated by the video reproducing device makes it possible to distribute a load of the video providing device. Furthermore, the video reproducing device expelled as an over-capacity device is unable to view live the video captured at the installation position (viewpoint location) of the video providing device; however, the video reproducing device can relive the video as long as a time delay is permitted.

The real video captured by each video providing device is also transmitted to the delivery server. The delivery server records the received video to be linked to information that identifies the video providing device that is the transmission source or information that can identify the viewpoint location where the video is captured (the property in which the video providing device is installed or the room in the property), a time zone in which the video is captured, an environment where the video is captured, or the like. When a transmission start request to instruct the time zone or the capture environment such as a season or a weather to be switched over is transmitted from the video reproducing device, the delivery server switches over from transmission of the real video from the video providing device to transmission of the archived video recorded in the external device.

D. Preview of Real Estate

Figure 8:
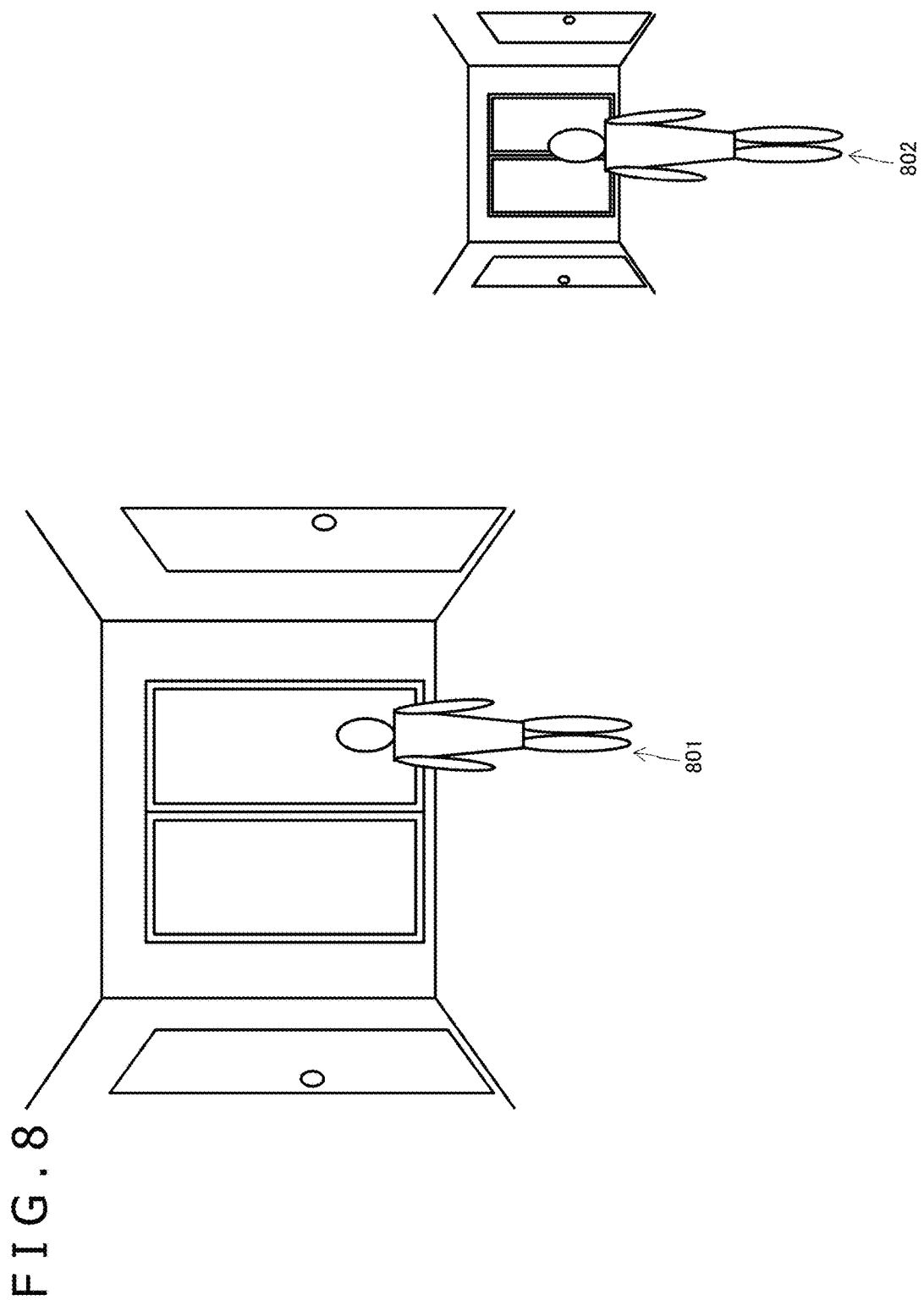
FIG. 8 is a diagram illustrating an example of applying the video viewing system 100 to a preview of a real estate property.

FIG. 8 illustrates an example of applying the video viewing system 100 to a preview of a real estate property. Reference number 801 denotes the user (previewer of the real estate property, salesperson of the real estate company, or the like) present at the real estate property (on the spot), and the user owns or is equipped with the video providing device (described above). On the other hand, reference number 802 denotes the user who does not visit the spot but browses property information at the place (for example, shop of the real estate company or house of the user) apart from the spot, and who is viewing the video of the property captured by the video providing device using the video reproducing device (described above).

Figure 9:
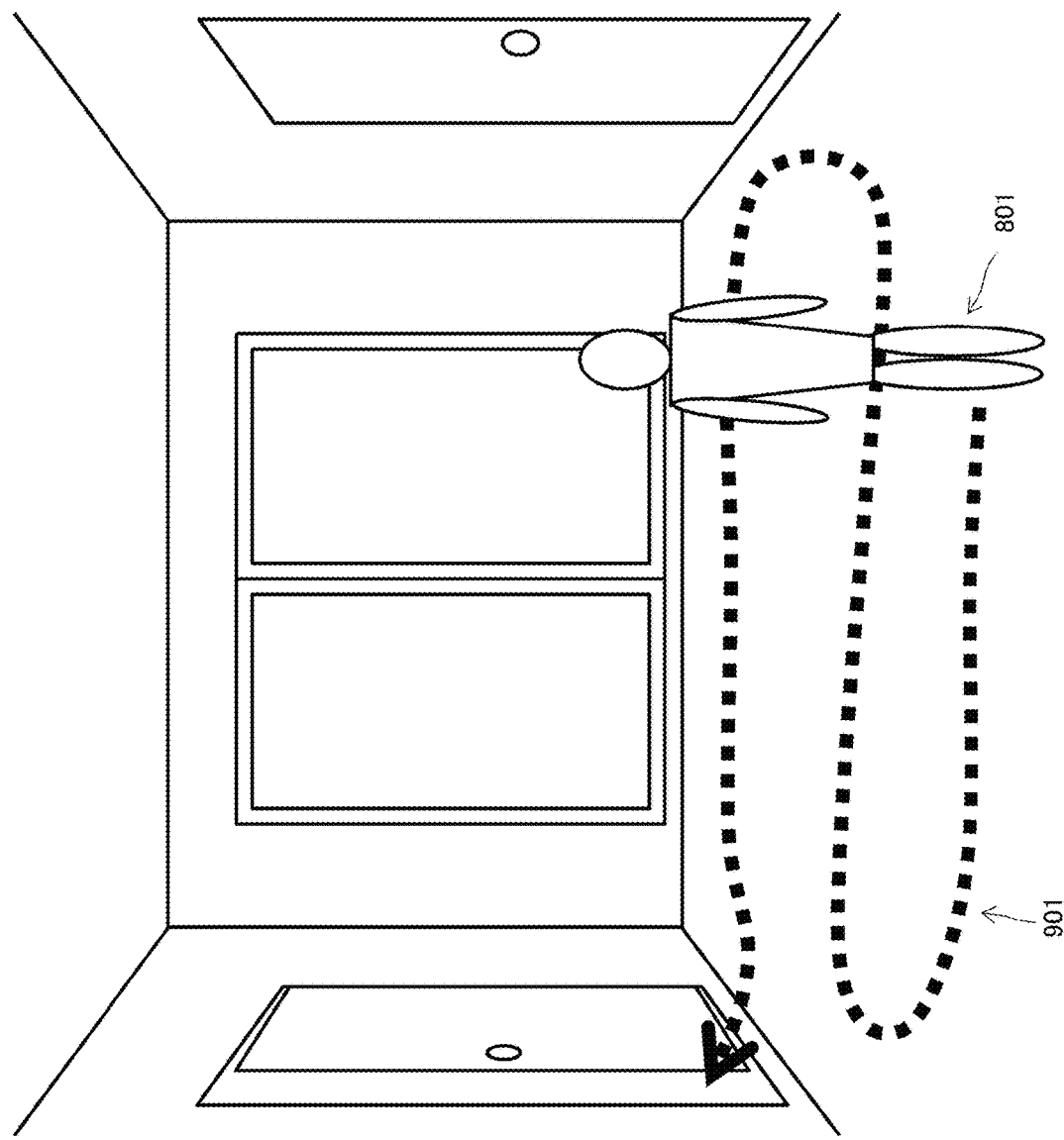
FIG. 9 is a diagram illustrating an example of applying the video viewing system 100 to the preview of the real estate property.

As indicated by reference number 901 in FIG. 9, the user 801 explains the locational condition, the floor plan, equipment, and the like of the property and gives user's impressions while walking around in the property, and yet opens a door to look around another room. The other user 802 can view the real video of the property in a manner close to reality without taking the time to visit the spot, so that it is possible to realize an efficient preview. In other words, applying the video viewing system 100 to the preview of the real estate makes it possible to improve customer satisfaction.

E. Method of Coding Whole-sky Video

The video viewing system 100 according to the present embodiment supposes that the video providing device captures the whole-sky video of the real estate property and that the user views the whole-sky video by the video reproducing device installed at a remote place from the property.

While the whole-sky video is originally image data of three-dimensional coordinates (XYZ), mapping the image data onto two-dimensional coordinates (UV) makes it possible to compress and code the image data using a standard motion video data compression and coding scheme such as H.264 and transmit and accumulate the data. Needless to say, the scheme for compressing and coding the motion video data on a two-dimensional plane is not always limited to the standard scheme.

Figure 10:
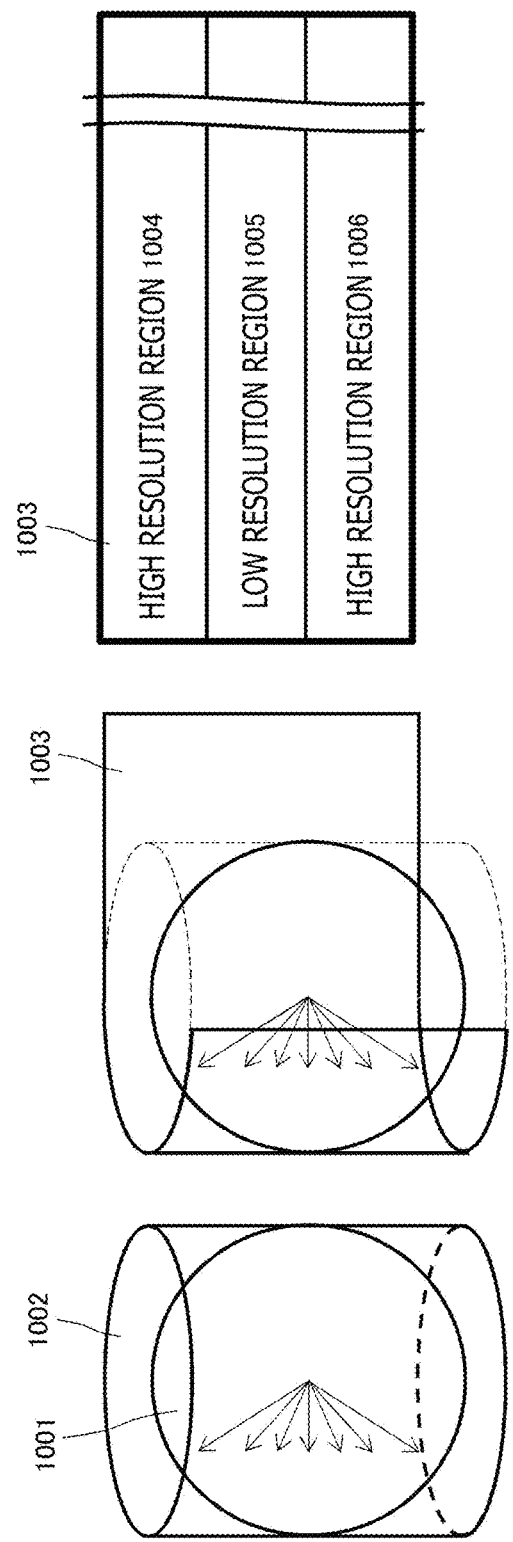
FIG. 10 is an illustrative diagram of a cylindrical projection method for projecting a whole-sky video onto a cylinder and developing the projected video onto a plane.

As a method of mapping the whole-sky video onto a two-dimensional plane, there is known a cylindrical projection method (refer to, for example, PTL 2) including projecting a whole-sky video including a sphere 1001 onto a cylinder 1002 and developing this cylinder onto a plane 1003, as illustrated in FIG. 10. Video data mapped onto the two-dimensional UV plane 1003 can be compressed and coded using the standard motion video data compression and coding scheme such as H.264 and transmitted and accumulated. In addition, at a time of reconstructing the whole-sky video, the video data developed onto the two-dimensional plane may be mapped onto the sphere on the basis of the mapping method, that is, a correspondence relation between the two-dimensional coordinates (UV) and the original three-dimensional coordinates (XYZ).

In a case of using the cylindrical projection method as described above, upper and lower high latitude regions 1004 and 1006 become high resolution regions in which the number of pixels mapped per unit area of the original sphere is large, while a central low latitude region 1005 becomes a low resolution region in which the number of pixels mapped per unit area of the original sphere is small.

It is supposed that an important eye line as visual information is present in the horizontal direction, that is, in the central low latitude region. Owing to this, in a case of mapping the whole-sky video by the cylindrical projection method as illustrated in FIG. 10, redundancy occurs that a video on the eye line is in the low resolution region 1005 and a video out of the eye line is in the high resolution regions 1004 and 1006. Furthermore, when the video reproducing device displays the whole-sky video decompressed to the original sphere, waste occurs to the effect that the video at a height of the eye line is worst in deterioration while the video in parts out of the eye line has a high resolution. Moreover, increasing the resolution of the region 1005 causes increases in resolutions of the peripheral regions 1004 and 1006 accordingly, resulting in an increase in data amount.

Furthermore, in a case in which the captured original whole-sky video is an image at an ultrahigh resolution such as 4K, 8K, or 16K, a projection method capable of efficiently reducing (compressing) the data amount is preferable.

Figure 11:
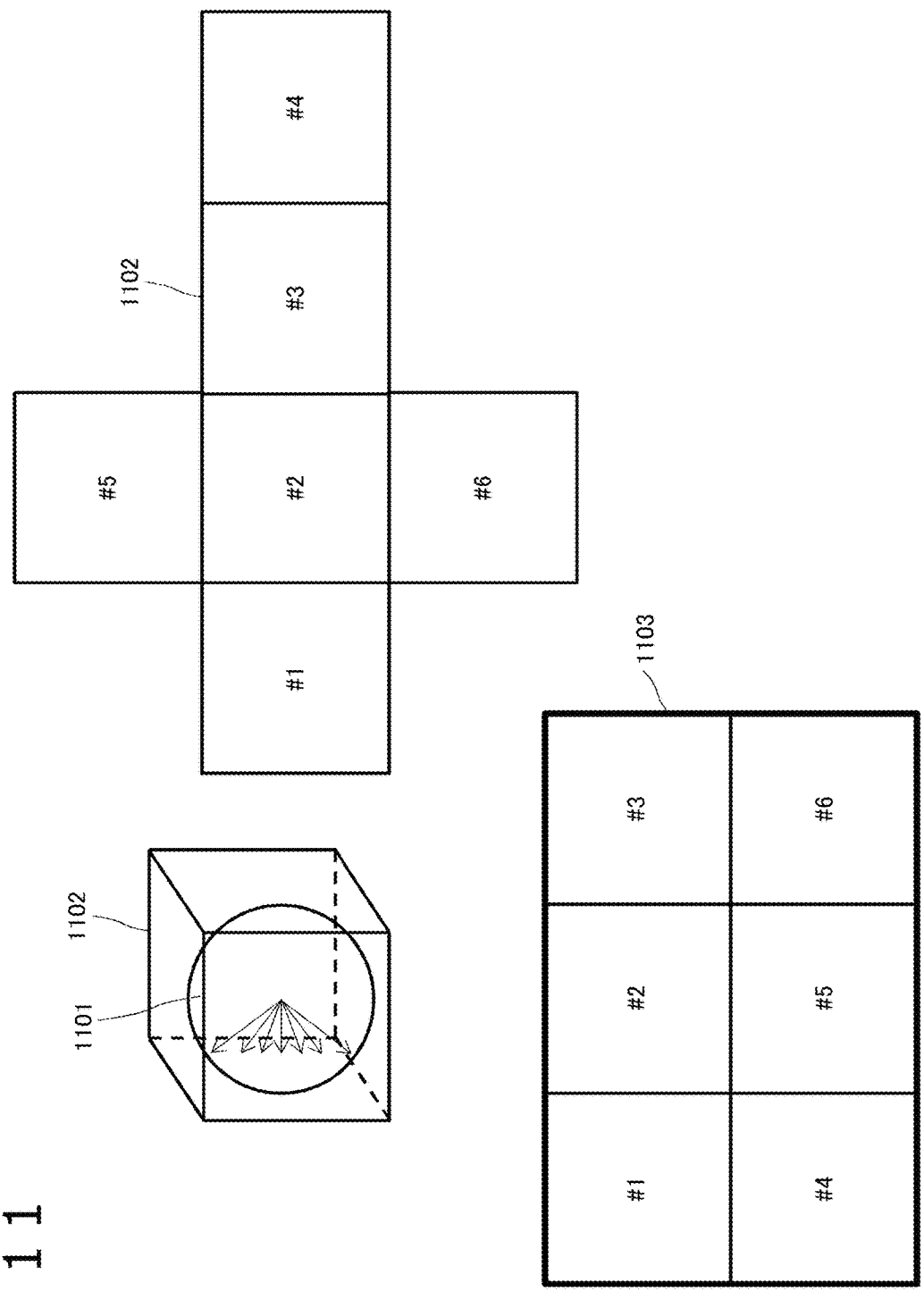
FIG. 11 is an illustrative diagram of a mapping method for projecting a spherical whole-sky video onto a cube and developing the projected video onto a plane.

By contrast, as illustrated in FIG. 11, a mapping method including projecting a whole-sky video of a sphere 1101 onto a cube 1102 and developing the cube 1102 onto a plane 1103 is conceivable. In a case of this method, video data projected onto side surfaces #1 to #6 of the cube is mapped onto a plane 1103 of two-dimensional coordinates (UV) as illustrated in the figure. In addition, the video data mapped onto the two-dimensional UV plane 1103 can be compressed and coded using the standard motion video data compression and coding scheme such as H.264 and transmitted and accumulated. Transmission can be performed. At a time of reconstructing the whole-sky video, the video data developed onto the two-dimensional plane 1103 may be mapped onto the sphere on the basis of the mapping method, that is, a correspondence relation between the two-dimensional coordinates (UV) and the original three-dimensional coordinates (XYZ).

According to the mapping method including projecting the whole-sky video of the sphere 1101 onto the cube 1102 and developing the cube 1102 onto the plane 1103 as illustrated in FIG. 11, image information associated with the sphere 1101 is dispersed to the six side surfaces #1 to #6 of the cube 1102 nearly equally and the side surfaces are, therefore, identical in resolution. In other words, a problem that the regions have nonuniform resolutions (or important visual information in an eye line direction deteriorates), which occurs to the cylindrical projection method (refer to FIG. 10), does not occur to this mapping method. Therefore, when the video reproducing device displays the whole-sky video decompressed to the original sphere has a nearly equal resolution over an entire circumference. Furthermore, the method of projecting the whole-sky video onto the cube can reduce the data amount by approximately 20%. It is noted that a method of projecting the whole-sky video onto not the cube but another regular polyhedron can also exhibit an effect that the uniform resolution can be achieved.

Figure 12:
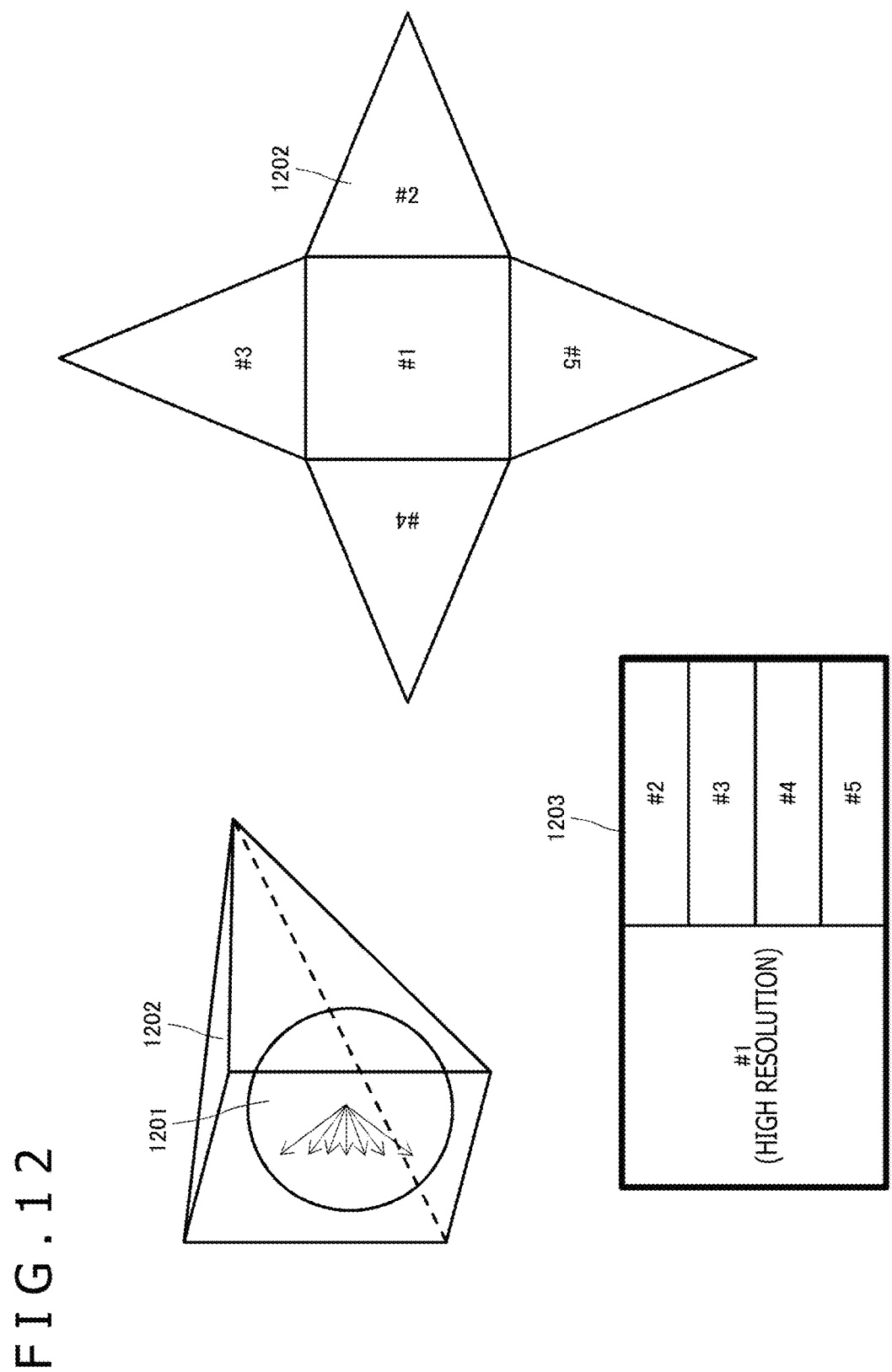
FIG. 12 is an illustrative diagram of a mapping method for projecting a spherical whole-sky video onto a quadrangular pyramid and developing the projected video onto a plane.

Moreover, as illustrated in FIG. 12, a mapping method including projecting a whole-sky video of a sphere 1201 onto a quadrangular pyramid 1202 and developing the quadrangular pyramid 1202 onto a plane 1203 is conceivable. In a case of this method, video data projected onto a bottom surface #1 and side surfaces #2 to #5 of the quadrangular pyramid is mapped onto the plane 1203 of two-dimensional coordinates (UV) as illustrated in the figure. In addition, the video data mapped onto the two-dimensional UV plane 1203 can be compressed and coded using the standard motion video data compression and coding scheme such as H.264 and transmitted and accumulated. At a time of reconstructing the whole-sky video, the video data developed onto the two-dimensional plane may be mapped onto the sphere on the basis of the mapping method, that is, a correspondence relation between the two-dimensional coordinates (UV) and the original three-dimensional coordinates (XYZ).

The mapping method including projecting the whole-sky video of the sphere 1201 onto the quadrangular pyramid 1202 and developing the quadrangular pyramid 1202 onto the plane 1203 as illustrated in FIG. 12 is characterized in that image information associated with the sphere 1201 is mapped onto the bottom surface at a high resolution while being mapped onto the four side surfaces at a low resolution. For example, disposing the quadrangular pyramid 1202 in such a manner that a point of gaze or point of attention is contained in the bottom surface and projecting the whole-sky video onto the quadrangular pyramid 1202 enable efficient compression and coding of the whole-sky video. In addition, when the video reproducing device displays the whole-sky video decompressed to the original sphere, an important region is displayed at a high resolution as visual information near the point of gaze or point of attention and peripheral parts therefor are displayed at a low resolution. Therefore, mapping the whole-sky video using the quadrangular pyramid with the bottom surface thereof facing a front of the user makes it possible to improve efficiency for transmission and accumulation of the whole-sky video.

Figure 13:
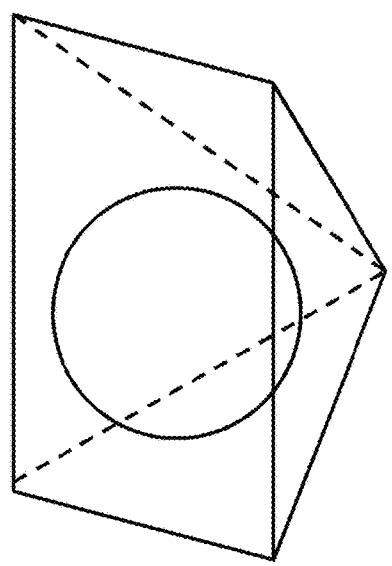
FIG. 13 is an illustrative diagram of a mapping method for projecting a spherical whole-sky video onto a quadrangular pyramid and developing the projected video onto a plane.
Figure 14:
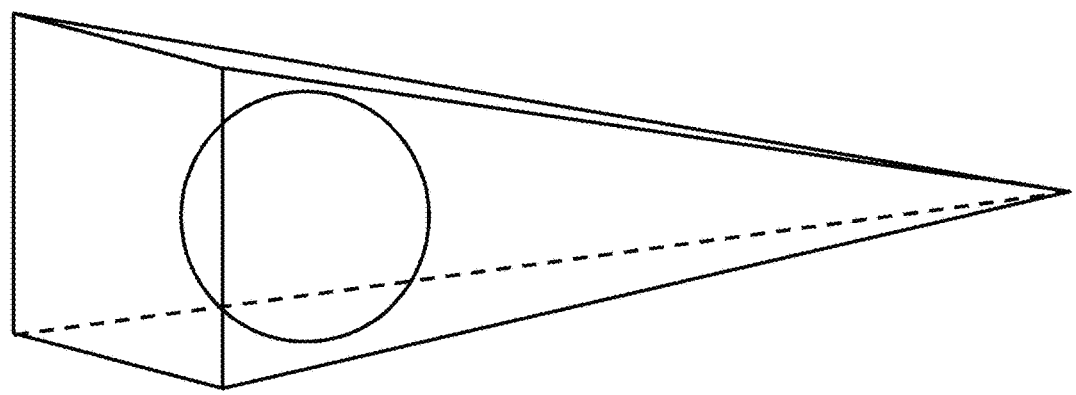
FIG. 14 is an illustrative diagram of a mapping method for projecting a spherical whole-sky video onto a quadrangular pyramid and developing the projected video onto a plane.

The method of projecting the whole-sky video onto the quadrangular pyramid can reduce the data amount to approximately 80%. Furthermore, projecting the sphere onto a quadrangular pyramid having a wide bottom surface (refer to FIG. 13) makes large a region mapped onto the bottom surface, makes it possible to leave wide the region that can be kept at a high resolution, but reduces a data amount reduction rate. Conversely, projecting the sphere onto a quadrangular pyramid having a narrow (or thin and long) bottom surface (refer to FIG. 14) makes narrow a region mapped onto the bottom surface while keeping the region at a high resolution and makes it possible to reduce the data amount. For example, the data amount can be reduced greatly by projecting the whole-sky video onto the quadrangular pyramid having the wide bottom surface in a case in which the region of gaze or attention (important as visual information) is wide, and by mapping the whole-sky video onto the quadrangular pyramid having the narrow bottom surface in a case in which the region of gaze or attention is narrow (for example, in a case in which attention is paid to a specific subject that is a piece of furniture such as a tap water faucet in a kitchen or a doorknob). Therefore, depending on circumstances, such as what type of video is to be delivered from the video providing device or which portion of the whole-sky video the video reproducing device side pays attention to, a shape of the quadrangular pyramid onto which the whole-sky video is mapped may be adaptively selected. Needless to say, a method of mapping the whole-sky video onto a polygonal pyramid other than the quadrangular pyramid can exhibit similar effects to those described above. Moreover, the polygonal pyramid onto which the sphere is projected is not limited to the regular polygonal pyramid.

Figure 15:
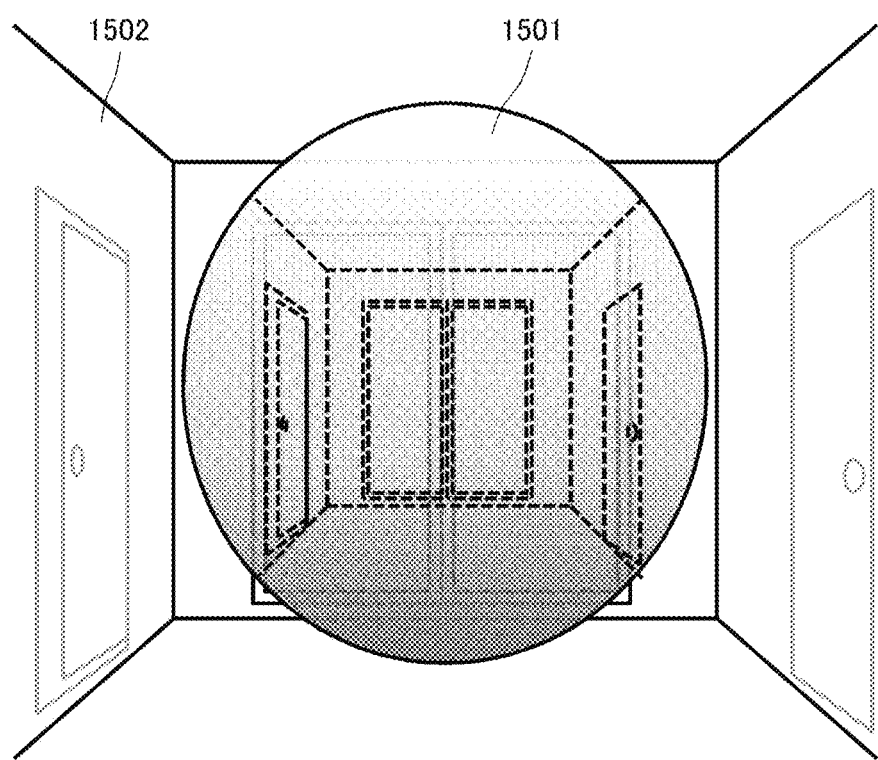
FIG. 15 is a diagram illustrating an example of mapping a whole-sky video onto a surface of an object having an arbitrary shape.

Examples of mapping the whole-sky video onto three-dimensional models each having a geometrically regular shape such as the cylinder, the cube, or the pyramid and then developing the three-dimensional model onto the plane have been illustrated in FIGS. 10 to 14. In addition to these examples, an application example of mapping the whole-sky video onto an object having an arbitrary shape is further conceivable. For example, the whole-sky video may be projected onto a three-dimensional model fit with a shape of a space that is a subject to be captured. Specifically, in a case of a whole-sky video obtained by capturing an interior, a whole-sky video 1502 including wall surfaces in four sides, a ceiling, a floor surface, and the like of a room may be projected onto a surface of a three-dimensional model 1501 such as a rectangular solid approximate to a shape of the room (refer to FIG. 15), and the three-dimensional model 1501 may be mapped onto a two-dimensional plane. Mapping the whole-sky video using the three-dimensional model fit with the shape of the space makes it possible to guarantee a uniform image quality over the entire video and eliminate texture mapping errors resulting from the shape of the three-dimensional model.

F. Adaptive Coding/Transmission Processes on Whole-sky Video

It is preferable that the whole-sky video is stored and reproduced while being kept as a video captured by the video providing device and having a high image quality such as 4K, 8K or 16K. Without considerations to restrictions such as a storage capacity and a transmission load, it is preferable to map the whole-sky video by the cylindrical projection method and keep the image quality of the original whole-sky video. Nevertheless, the original video has a large data amount and entails problems of a load of the storage capacity during accumulation and a band load during transmission. Owing to this, the present applicant considers that it is preferable to adaptively switch over the shape of the three-dimensional model onto which the whole-sky video is mapped and compress and code the whole-sky video during accumulation or transmission.

For example, a case in which a broadband channel is secured between the video providing device 101 and the delivery server 103 in the video viewing system 100 as illustrated in FIG. 1, while a transmission band from the delivery server 103 to the video reproducing device 102 is not guaranteed is supposed. In such a case, the whole-sky video captured by the video providing device 101 is transmitted to the delivery server 103 while being kept at the high image quality such as 4K, 8K, or 16K and accumulated in the delivery server 103. At a time of delivering the whole-sky video from the delivery server 103 to the video reproducing device 102, the whole-sky video is subjected to a compression and coding process in the light of a communication load.

The methods of compressing and coding the whole-sky video described above (refer to FIGS. 10 to 15) have in common that the whole-sky video is temporarily projected onto the three-dimensional model (cube, quadrangular pyramid, or the like), the three-dimensional model is developed and mapped onto the two-dimensional UV plane, the whole-sky video is formed into motion video data in the two dimensions, and the two-dimensional motion video data is then compressed and coded. Needless to say, while the standard scheme such as H.264 can be used for compression and coding, the compression and coding scheme is not always limited to the standard scheme.

Features such as a data reduction amount and a storage state of an original image quality (resolution) vary depending on the shape, such as the cylinder, the cube, the pyramid, or the shape of the subject, of the three-dimensional model onto which the whole-sky video is projected. While the image quality in the eye line direction deteriorates with the cylindrical projection method, the mapping method including projecting the whole-sky video onto the cube can make uniform the quality of the video over the entire circumference. Furthermore, the mapping method including mapping the whole-sky video onto the quadrangular pyramid can keep the video projected onto the bottom surface of the quadrangular pyramid at a high image quality, while making the other regions at a low image quality; thus, it is possible to increase a data reduction amount as a whole. Moreover, a magnitude of the region kept at the high image quality and the data reduction amount can be controlled depending on a magnitude of the bottom surface of the quadrangular pyramid onto which the whole-sky video is projected. Further, the mapping method for the whole-sky video using the three-dimensional model fit with the shape of the space makes it possible to guarantee the uniform image quality over the entire video and eliminate texture mapping errors, but makes small the data reduction amount.

Which mapping method is optimum dynamically varies depending on circumstances. In other words, the mapping method for the whole-sky video may be dynamically switched over depending on circumstances. While various factors are present for determining the optimum mapping method, examples of the factors include (1) to (5) as follows.

(1) Optimum Mapping Method Based on Circumstances of Video Providing Device Side For example, in a case in which the person making a preview of the real estate property or the salesperson accompanying the previewer instructs or urges a specific region to be gazed or observed by words, behaviors, gestures, and the like, it is appropriate to apply the mapping method using the quadrangular pyramid or the cube and capable of guaranteeing the image quality of the region.

In a case in which the region of gaze or attention by the user is narrow and the user is not interested in regions deviated from the region (for example, in a case in which a specific subject that is a piece of furniture such as a tap water faucet in a kitchen or a doorknob), it is more preferable to apply the mapping method using the quadrangular pyramid and capable of greatly reducing the data reduction amount of the regions other than the region of interest.

On the other hand, in a case in which the user desires to convey an atmosphere of the overall property (for example, an instance of going through a hallway and entering a living room), it is preferable to transmit a video that is not high in resolution but uniform using the mapping method using the cube.

Furthermore, the mapping method may be adaptively switched over depending on a state in which the user previews the property (user stops and is looking at details, walks and moves within the room or to a next room, or moves by running), or a user's environment (that the user is in a hallway, in a kitchen, in a living room, in a wide room, in a private room, or in a balcony).

Figure 16:
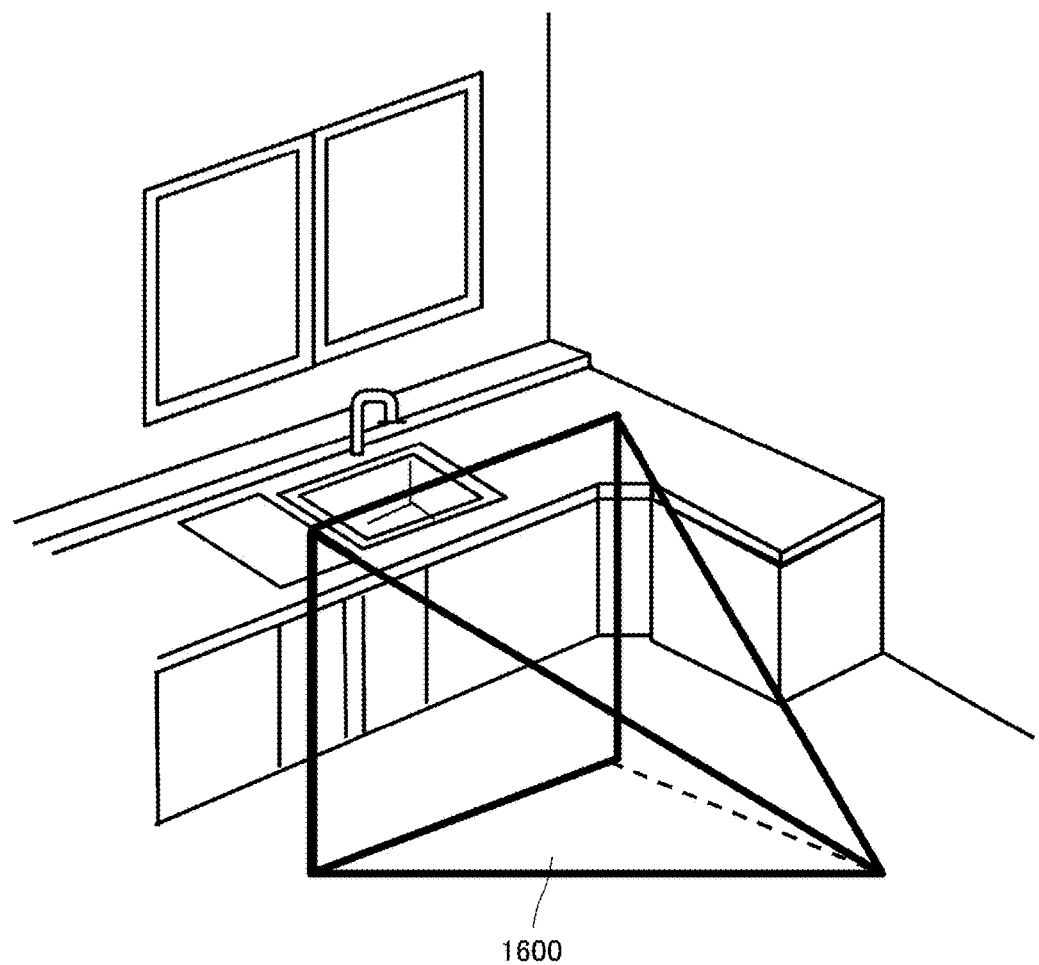
FIG. 16 is an illustrative diagram of a mapping method for a whole-sky video depending on circumstances.

For example, in a state in which the user making a preview of the property stops in front of the kitchen and is looking at the kitchen or a state in which the salesperson is explaining the kitchen, it can be said that the mapping method including mapping the whole-sky video onto a quadrangular pyramid 1600 with a bottom surface thereof facing a direction of the kitchen as illustrated in FIG. 16 is appropriate. Moreover, in a state in which the user is further gazing at a specific subject such as a sink, a faucet, or a closet or drawer, the bottom surface of the quadrangular pyramid 1600 onto which the whole-sky video is projected may be narrowed while causing the bottom surface to face the subject so that only the subject can be transmitted at a higher resolution.

On the other hand, in a case in which the user stops and is not gazing at a specific part of the property but is looking out over the entire room, it is preferable to apply the mapping method capable of projecting the whole-sky video onto the three-dimensional model such as the cube and transmitting the entire whole-sky video at a uniform resolution and a uniform image quality so that the video reproducing device side can similarly take a bird's-eye view of the entire room and feel the atmosphere.

Moreover, in a circumstance in which the user who stopped starts walking or is about to move into a room next door, applying the mapping method including projecting the whole-sky video onto the quadrangular pyramid with the bottom surface thereof facing a moving direction of the user enables the video reproducing device side to display the video at a high resolution in the moving direction; thus, presence that the user is moving can be appropriately felt.

When the delivery server receives a signal that indicates, for example, a circumstance at a time of capturing the whole-sky video from the video providing device and delivers the whole-sky video to the video reproducing device, the delivery server may control switchover of the mapping method on the basis of information contained in the signal.

(2) Optimum Mapping Method Based on Circumstance of Video Reproducing Device Side For example, in a case in which the user of the video reproducing device have had a strong interest in a specific subject rather than words, behaviors, gestures, and the like or indicated user's intention to desire to gaze at the specific subject (or look at the specific subject once again), in other words, to the subject to which the user desires to pay attention at a time of viewing the realtime video currently transmitted from the video providing device or the archived video recorded in the delivery server and previewing the real estate property at a remote location, then it is appropriate to apply the mapping method using the quadrangular pyramid or the cube and capable of guaranteeing the image quality of the subject. Furthermore, in a case in which the region of gaze or attention by the user is narrow and the user is not interested in regions deviated from the region (for example, in a case in which the user pays attention to a specific subject that is a piece of furniture such as a tap water faucet in a kitchen or a doorknob), it is more preferable to apply the mapping method using the quadrangular pyramid and capable of greatly reducing the data reduction amount of the regions other than the subject of interest. On the other hand, in a case in which the user desires to grasp the atmosphere of the overall property (for example, an instance of going through a hallway and entering a living room), it is preferable to transmit a video that is not high in resolution but uniform using the mapping method using the cube.

For example, the video reproducing device may transmit information associated with the visual line direction, the head position, or the posture of the user measured by the sensor section 609 to the delivery server (or video providing device) that is a source of delivering the whole-sky video. In addition, the delivery server (or video providing device) side may transmit the motion video data compressed and coded using the mapping method including projecting the whole-sky video onto the quadrangular pyramid with the bottom surface thereof facing the visual line direction of the user to the video reproducing device.

Alternatively, the video reproducing device may collect a user's audio-based request (to grasp the atmosphere of the overall room or to have a close look at a piece of furniture) by the sound collection section 607 and transmit an instruction based on a sound recognition result of the sound collection section 607 to the delivery server (or video providing device) that is the source of delivering the whole-sky video.

The delivery server may receive a signal that indicates, for example, a circumstance at a time of viewing the whole-sky video from the video reproducing device that is a delivery destination and control switchover of the mapping method on the basis of information contained in the signal.

(3) Optimum Mapping Method Based on Space

The mapping method may be adaptively switched over on the basis of information associated with a space which the user is making a preview of. For example, the mapping method per space or matching a change in space, for example, at a time of walking in a narrow hallway, at a time of entering a wide room from the hallway, or at a time of conversely exiting the room and moving to the hallway is specified in advance. In addition, spatial information during the preview is monitored and the mapping method is adaptively switched over in response to the spatial information and the change in space.

Figure 17:
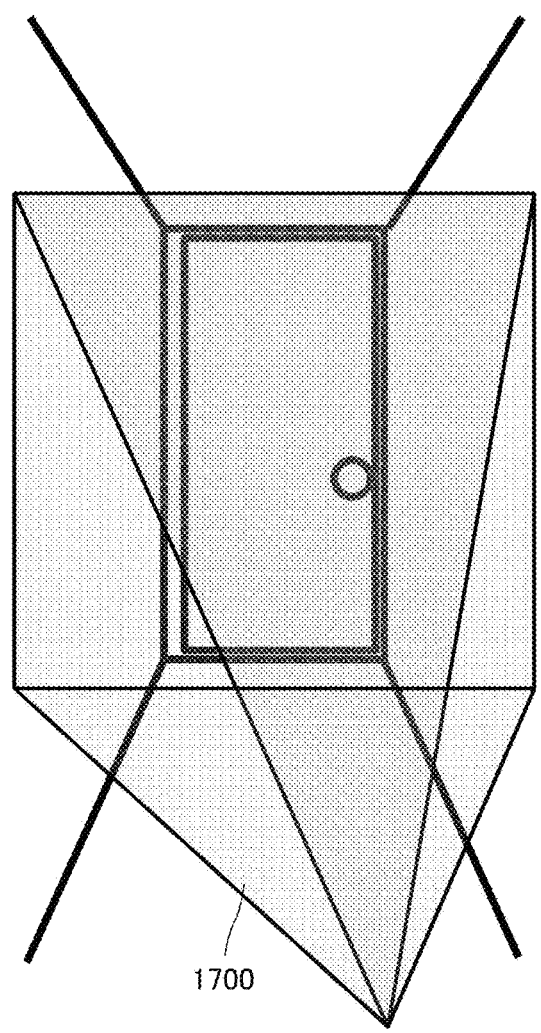
FIG. 17 is an illustrative diagram of a mapping method for a whole-sky video depending on circumstances.
Figure 18:
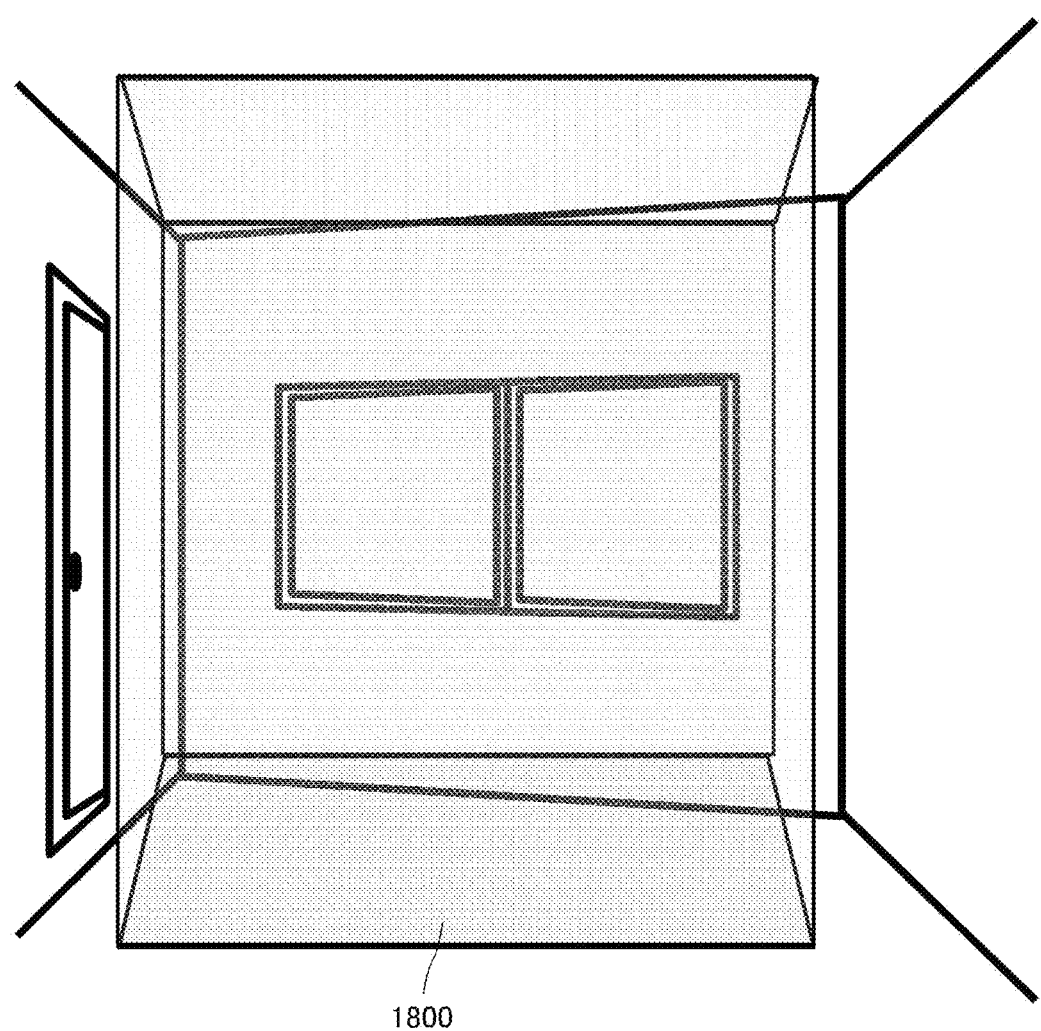
FIG. 18 is an illustrative diagram of a mapping method for a whole-sky video depending on circumstances.

For example, in a circumstance in which the user is walking in the hallway toward a door in the back, as illustrated in FIG. 17, the mapping method including projecting the whole-sky video onto a quadrangular pyramid 1700 with the bottom surface thereof facing the moving direction (front direction) of the user or facing backward is applied. In this case, the video reproducing device side displays a video in which the door in the back has a high resolution, so that the user takes an interest in a room through the door. In addition, at a moment of opening the door and entering the room, the mapping method is switched over to the mapping method including projecting the whole-sky video onto a cube 1800 as illustrated in FIG. 18. In this case, the video reproducing device side can look out over the whole-sky video with the overall room having a uniform resolution.

The delivery server may receive a signal that indicates, for example, the spatial information from the video providing device and control switchover of the mapping method on the basis of information contained in the signal. Alternatively, the delivery server may control the switchover of the mapping method on the basis of spatial information obtained by performing video analysis on the whole-sky video.

(4) Mapping Method in a Case of Delivering Video to a Plurality of Video Reproducing Devices In a case of delivering one whole-sky video from the delivery server to a plurality of video reproducing devices, the delivery server may multicast the same compressed and coded video to the plurality of video reproducing devices by applying the mapping method including projecting the whole-sky video onto the cube (refer to FIG. 11) on supposition that the individual video reproducing devices vary in the visual line direction of viewing the whole-sky video. Even if the individual video reproducing devices vary in the visual line direction of viewing the whole-sky video, it is possible to keep the video in any visual line direction at a uniform resolution, that is, a constant image quality. It can be said that this method is a multicast delivery method for the whole-sky video that enables the user to feel average satisfaction by all the video reproducing devices.

Figure 19:
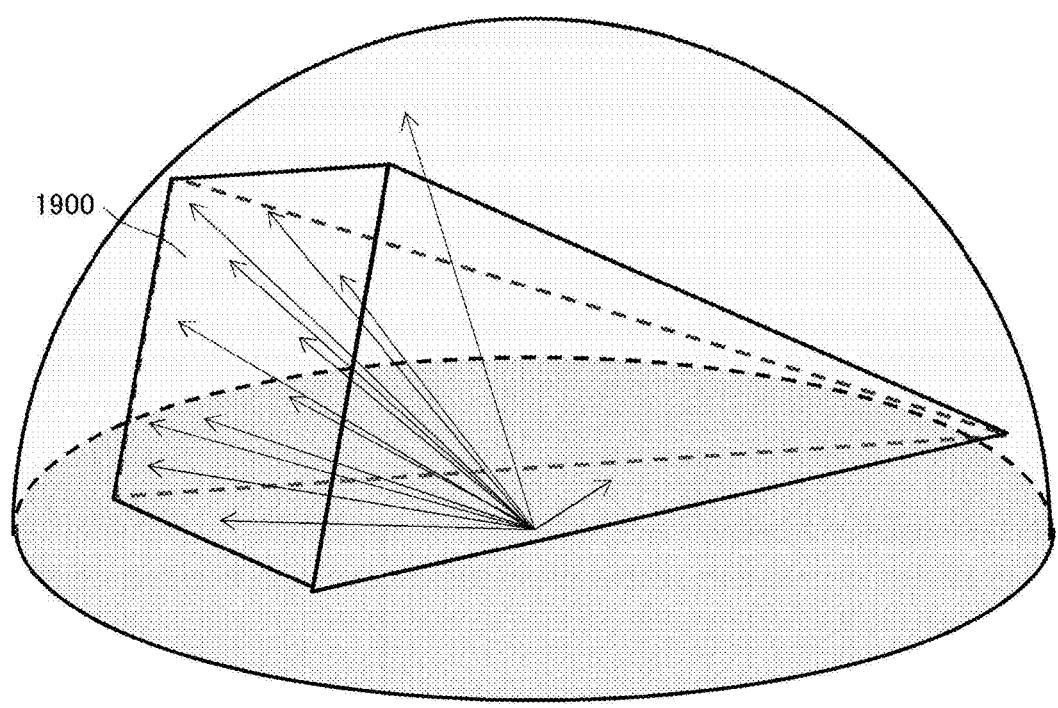
FIG. 19 is an illustrative diagram of a mapping method for a whole-sky video depending on circumstances.

Furthermore, when the visual line directions for most of the video reproducing devices are within a specific region despite a difference among the individual video reproducing devices in the visual line direction of viewing the whole-sky video, the delivery server may multicast the same compressed and coded video to the plurality of video reproducing devices by applying the mapping method including projecting the whole-sky video onto a quadrangular pyramid 1900 with a bottom surface thereof facing the specific region as illustrated in FIG. 19. While the user views the video at a low resolution and a deteriorated image quality in part of the video reproducing devices for which the visual line faces the video projected onto side surfaces of the quadrangular pyramid, most of the video reproducing devices enables the user to view a high image quality video projected onto the bottom surface of the quadrangular pyramid and kept at a high resolution. It can be said that this method is a multicast delivery method for the whole-sky video that enables the user to feel utmost satisfaction by more video reproducing devices.

Figure 20:
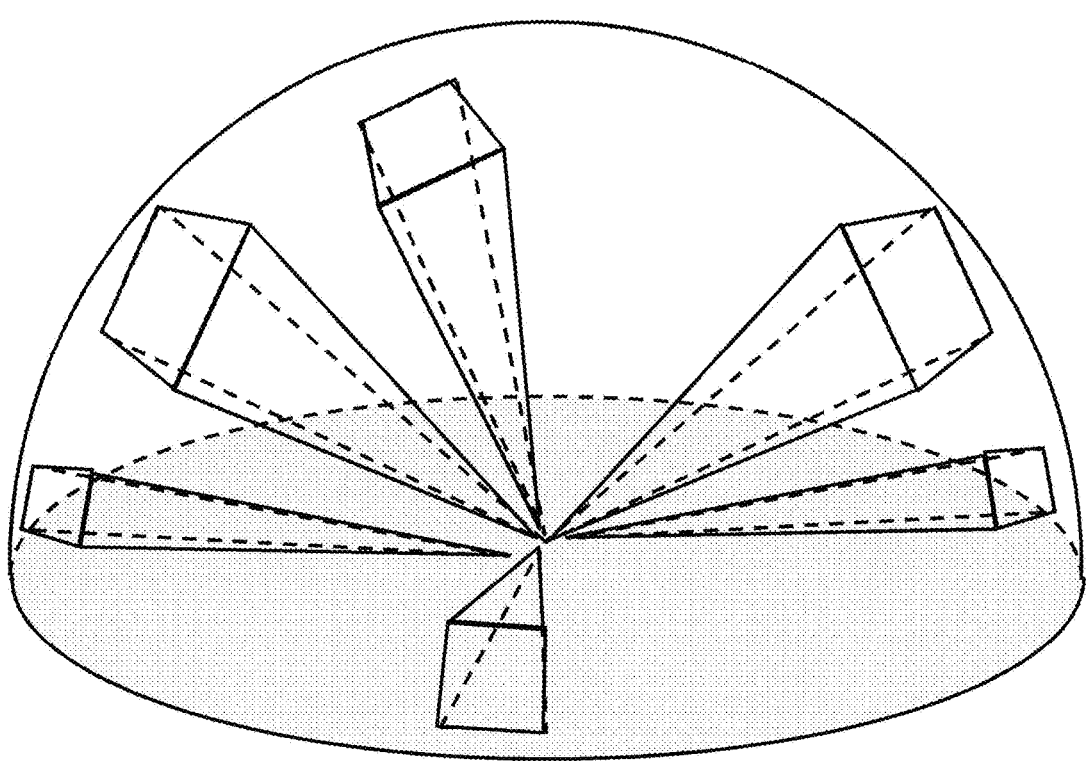
FIG. 20 is an illustrative diagram of a mapping method for a whole-sky video depending on circumstances.

Moreover, a method of delivering the whole-sky video projected onto a quadrangular pyramid that matches each visual line direction and compressed and coded to the individual video reproducing devices as illustrated in FIG. 20. In this case, the delivery server unicasts compressed and coded videos different among the video reproducing devices. The user can feel maximum satisfaction by all the video reproducing devices. A problem that a communication load increases as the delivery server delivers the whole-sky video by performing unicast delivery many times even if a compression rate of individual unicast data is high.

The delivery server may receive a signal that indicates, for example, the visual line direction from each of the plurality of video reproducing devices that are delivery destinations, and control switchover of the mapping method while considering other circumstances such as the communication load.

(5) Mapping Method in Response to Load

The methods (1) to (4) are basically the appropriate mapping methods depending on the circumstance of the video providing device side (or of the spot of the preview of the real estate property) or the circumstance of the video reproducing device side (or of the viewer of the whole-sky video captured in the preview). Even with the mapping method appropriate for every circumstance, it is often difficult to perform realtime delivery (or seamless video streaming) from the viewpoint of the communication load.

In the video viewing system 100 configured as illustrated in FIG. 1, the communication load is applied to the channel between the video providing device 101 and the delivery server 103 and the channel from the delivery server 103 to the video reproducing device 102 each. In system operation such that a broadband is guaranteed for the channel between the video providing device 101 and the delivery server 103, while a transmission band from the delivery server 103 to the video reproducing device 102 is not guaranteed, a case in which it is necessary to select a mapping method that does not match the circumstances of the video providing device and the video reproducing device in response to the transmission load from the delivery server 103 is supposed.

For example, even in a case in which the video reproducing device requests the delivery server to transmit the whole-sky video by the mapping method using the cube, the delivery server often compresses and codes the whole-sky video and delivers the compressed and coded whole-sky video to the video reproducing device by the mapping method using the quadrangular pyramid and having a high compression ratio.

Furthermore, even in a case in which a plurality of video reproducing devices request the delivery server to unicast compressed and coded data by the mapping method using the quadrangular pyramid with the bottom surface thereof facing each visual line direction, the delivery server often switches over to multicast delivery of the compressed and coded data by the mapping method using a common quadrangular pyramid depending on a circumstance in which an entire transmission data amount is enormous.

The delivery server may exercise adaptive control over switchover of the mapping method depending on circumstances, such as communication loads, of the channels used to deliver the whole-sky video by, for example, monitoring the circumstances of the channels. The delivery server can monitor the circumstances of the channels by, for example, measuring the number of times of packet retransmission or acquiring feedback information such as a packet error rate or a received signal strength (applicable only for wireless communication) from the video reproducing device that is the delivery destination.

Figure 21:
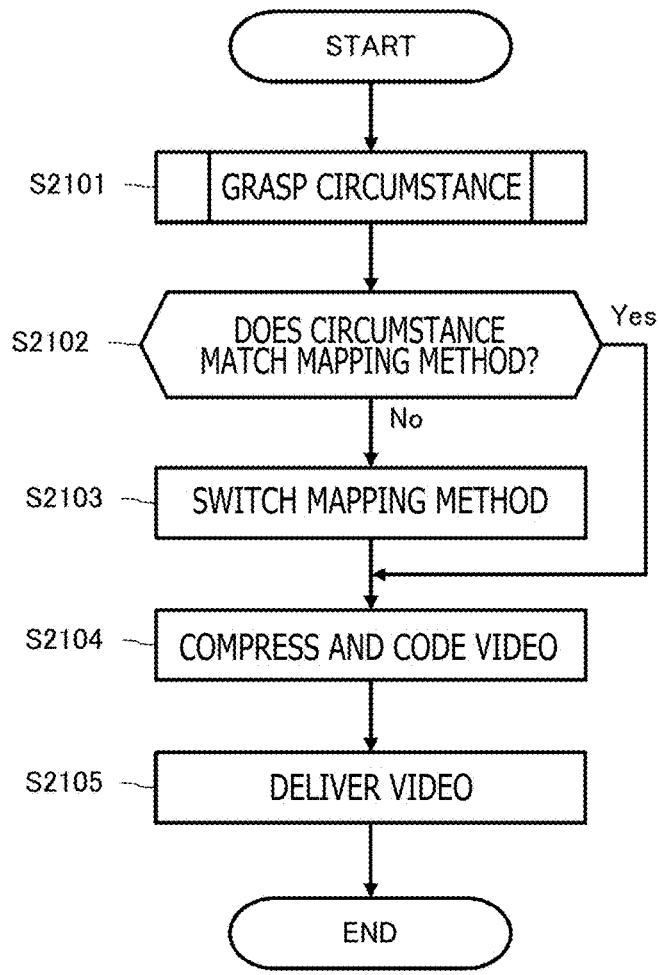
FIG. 21 is a flowchart illustrating schematic processing procedures for dynamic/legal switchover of a mapping method for a whole-sky video.

FIG. 21 illustrates schematic processing procedures for dynamic/legal switchover of the mapping method for the whole-sky video in the form of a flowchart. The processing procedures are supposed to be carried out at a time of delivering the whole-sky video from the delivery server to the video reproducing device. Needless to say, the processing procedures can be carried out in a case of transmitting the whole-sky video from the video providing device to the delivery server or a case of directly transmitting the whole-sky video from the video providing device to the video reproducing device (without via the delivery server).

First, information associated with a circumstance for the delivery of the whole-sky video is acquired (Step S2101). As described above, the circumstance mentioned herein includes the circumstance of the video providing device side, the circumstance of the video reproducing device side, the spatial information associated with the whole-sky video, the circumstance in the case of delivering the video to a plurality of video reproducing devices, the communication load, and the like.

It is then checked whether or not the currently set mapping method matches the circumstance grasped in Step S2101 (Step S2102).

In a case in which the currently set mapping method matches the current circumstance (Step S2102; Yes), then compressing and coding the whole-sky video (Step S2104) and delivering the whole-sky video to the video reproducing device (Step S2105) are repeatedly executed without changing the mapping method.

On the other hand, in a case in which the currently set mapping method does not match the current circumstance (Step S2102; No), then the mapping method is switched over to the mapping method that matches the current circumstance (Step S2103), and compressing and coding the whole-sky video (Step S2104) and delivering the whole-sky video to the video reproducing device (Step S2105) are executed.

Furthermore, while the whole-sky video is delivered to the video reproducing device, the circumstance is always monitored and the mapping method is adaptively switched whenever the circumstance changes.

In a case in which a plurality of circumstances are acquired in Step S2101 and the matching mapping method differs among the circumstances, then a priority of each circumstance is determined, and the mapping method that matches the circumstance having a high priority may be applied.

For example, it is necessary to determine the mapping method by most preferentially considering the communication load in order to guarantee that the user can view the whole-sky video by the video reproducing device without a delay or an image interruption.

Moreover, for example, in a case in which a higher priority is to be given to explanation of the property by the salesperson of the real estate company or in a case in which serious consideration is to be given to an opinion of a person previewing the property on the spot, the mapping method may be determined by preferentially considering the circumstance of the video providing device rather than that of the video reproducing device.

Alternatively, in a case of, for example, allowing a person who is unable to visit the spot and to actually preview the property to view the video freely, the mapping method may be determined by preferentially considering the circumstance of the video reproducing device side.

Every mapping method has in common that the whole-sky video is compressed and coded by the following procedures.

(1) Adaptively select a three-dimensional model onto which a whole-sky video is projected on the basis of a circumstance.

(2) Project image information associated with the whole-sky video onto each side surface of the three-dimensional model.

(3) Develop the three-dimensional model and perform UV mapping to map the image information projected onto each side surface onto a two-dimensional plane.

(4) Compress and code the image information mapped onto the two-dimensional plane using a standard motion video data compression and coding scheme such as H.264.

Furthermore, the side of receiving and reproducing the compressed and coded whole-sky video such as the video reproducing device may decode the whole-sky video in reverse procedures from those described above.

(1) Decode the received compressed and coded video in accordance with a specified compression and coding scheme such as H.264.

(2) Perform inverse UV mapping to map the decoded image information on the two-dimensional plane onto each side surface of the three-dimensional model.

(3) Inversely project the image information mapped onto each side surface of the three-dimensional model onto a sphere to decode the whole-sky video.

In a case in which the mapping method is known to both the compressed and coded video transmission side (for example, the delivery server) and the compressed and coded video receiving side (for example, the video reproducing device) such as a case of performing UV mapping on the whole-sky video always using the same three-dimensional model, only data regarding the coded and compressed video may be transmitted. On the other hand, in a case of system operation such that the mapping method is dynamically changed depending on various circumstances, what type of mapping method is applied to compress and code the whole-sky video on the transmission side is unknown to the receiving side. Owing to this, it is preferable to transmit the compressed and coded whole-sky video along with information for notifying the receiving side of the mapping method at a time of transmitting the compressed and coded whole-sky video.

Figure 22:
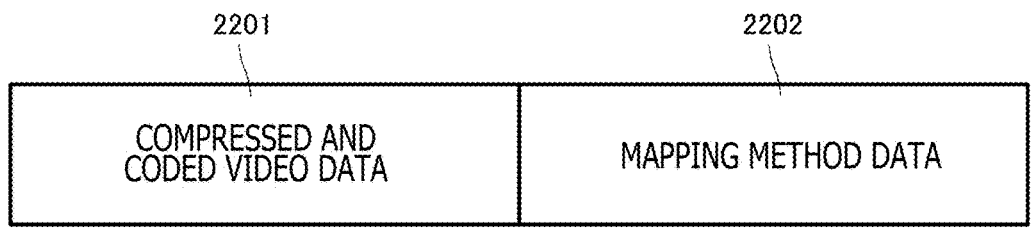
FIG. 22 is a diagram illustrating an example of a transmission format of a compressed and coded whole-sky video.

FIG. 22 illustrates an example of a transmission format of the compressed and coded whole-sky video. In the figure, a first half portion denoted by reference number 2201 is compressed and coded video data mapped onto the two-dimensional plane by UV mapping. Furthermore, a second half portion denoted by reference number 2202 is mapping method data related to a method of mapping the whole-sky video onto the two-dimensional plane, and includes shape data regarding the three-dimensional model used at the time of UV mapping.

Moreover, FIG. 23 illustrates an example of syntax of the compressed and coded whole-sky video. data (H.264) denotes compressed and coded two-dimensional video data. mapping data (UV mapping) denotes information that designates a three-dimensional model onto which the whole-sky video is projected. [texture, vertex, UV] denotes texture, a vertex, and a UV map (correspondence table between XYZ coordinates of the whole-sky video and UV coordinates of the two-dimensional plane).

According to the technique disclosed in the present specification, it is possible to appropriately control transmission of the video obtained by imaging, for example, the real estate property. Moreover, according to the technique disclosed in the present specification, it is possible to appropriately view the realtime video obtained by imaging, for example, the real estate property or the archived video and realize a preview in a manner close to reality even at a remote location from the property.

INDUSTRIAL APPLICABILITY

The technique disclosed in the present specification of the present disclosure has been described so far in detail while referring to the specific embodiments. Nevertheless, it is obvious that a person ordinary skill in the art could make revision of the embodiments or find replacements therefor within the scope of the technique disclosed in the present specification.

While the embodiments in which the technique disclosed in the present specification is applied to a real estate property preview system have been mainly described in the present specification, the scope of the technique disclosed in the present specification is not limited to these embodiments. The technique disclosed in the present specification is applicable to video transmission in various industrial fields. The technique disclosed in the present specification is applicable to applications of work support, care support, and temporary staffing in various industrial fields, including a medical field such as a surgical operation, a building site for construction work or the like, maneuvering of an airplane or a helicopter, navigation for an automobile driver, and instruction and coaching of sports. Furthermore, the technique disclosed in the present specification can be used in concert or sports watching and SNS (Social Network Service).

In summary, the technique disclosed in the present specification has been described in an illustrative form and should not be interpreted exclusively. Reference should be made to claims for the assessment of the scope of the technique disclosed in the present specification.

It is noted that the technique disclosed in the present specification can be configured as follows.

(1) An information processing device including:
a receiving section that receives a three-dimensional image;
a storage section that retains a three-dimensional model for mapping the three-dimensional image onto a two-dimensional image;
a transmission section that transmits the two-dimensional image; and
a control section, in which
the control section determines the three-dimensional model to be used on the basis of a user's instruction or a surrounding environment, maps the three-dimensional image onto the two-dimensional image on the basis of the determined three-dimensional model, and transmits the two-dimensional image to the transmission section.

(2) The information processing device according to (1), in which
the receiving section receives a whole-sky video as the three-dimensional image, and
the control section exercises switchover control over a shape onto which the whole-sky video is mapped among a plurality of three-dimensional models including at least one of a cylinder, a cube, a quadrangular pyramid, or a shape of a subject.

(3) The information processing device according to (2), in which
the receiving section receives a first signal from a first device that captures the whole-sky video, and
the control section exercises the switchover control on the basis of information contained in the first signal.

(4) The information processing device according to (3), in which
the control section exercises the switchover control in response to a user's instruction contained in the first signal.

(5) The information processing device according to (3), in which
the control section exercises the switchover control in response to information indicating a circumstance during capturing and contained in the first signal.

(6) The information processing device according to (3), in which
the control section switches over to mapping using the quadrangular pyramid with a bottom surface thereof facing the subject on the basis of information associated with the subject and contained in the first signal.

(7) The information processing device according to (2), in which
the transmission section transmits the two-dimensional image onto which the whole-sky video is mapped to a second device, and
the control section exercises the switchover control on the basis of information contained in a second signal received from the second device.

(8) The information processing device according to (7), in which
the control section exercises the switchover control on the basis of information associated with the subject and contained in the second signal.

(9) The information processing device according to (8), in which
the control section switches over to mapping using the quadrangular pyramid with a bottom surface thereof facing the subject.

(10) The information processing device according to (7), in which
the control section switches over to mapping using the quadrangular pyramid with a bottom surface thereof facing a direction of a visual line on the basis of visual line information contained in the second signal.

(11) The information processing device according to (7), in which
the control section exercises the switchover control in response to a user's instruction contained in the second signal.

(12) The information processing device according to (2), in which
the transmission section transmits the whole-sky video to a plurality of second devices, and
the control section exercises the switchover control on the basis of visual line information contained in the second signal received from each of the plurality of second devices.

(13) The information processing device according to (12), in which the control section exercises control to unicast the two-dimensional image onto which the whole-sky video is mapped using the quadrangular pyramid with a bottom surface thereof facing a direction of a visual line of each of the plurality of second devices to each of the plurality of second devices.

(14) The information processing device according to (12), in which the control section exercises control to multicast the two-dimensional image onto which the whole-sky video is mapped using the quadrangular pyramid with a bottom surface thereof facing a region including a majority of a visual line.

(15) The information processing device according to (2), further including:

a monitoring section that monitors a circumstance of a channel for transmitting the whole-sky video, in which the control section exercises the switchover control on the basis of the circumstance of the channel.

(16) The information processing device according to (1), in which the control section exercises control over the transmission section to transmit the two-dimensional image in a transmission format containing information for identifying the three-dimensional model used in mapping.

(17) An information processing method including:

a receiving step of receiving a three-dimensional image;

a storage step of retaining in a storage section a three-dimensional model for mapping the three-dimensional image onto a two-dimensional image;

a transmission step of transmitting the two-dimensional image; and a control step, in which the control step includes determining the three-dimensional model to be used on the basis of a user's instruction or a surrounding environment, and mapping the three-dimensional image onto the two-dimensional image on the basis of the determined three-dimensional model, and the transmission step includes transmitting the two-dimensional image.

(18) A three-dimensional image data transmission method including:

a step of incorporating two-dimensional map image data obtained by mapping the three-dimensional image onto a two-dimensional image on the basis of a three-dimensional model and attached data for identifying the three-dimensional model used in the mapping into one dataset; and a step of transmitting the dataset.

REFERENCE SIGNS LIST

100: Video viewing system
101: Video providing device
102: Video reproducing device
200: Video viewing system
201: Video providing device
202: Video reproducing device
300: Video viewing system
301: Video providing device
302: Video reproducing device
400: Video viewing system
401: Video providing device
402: Video reproducing device
500: Information processing device (video providing device)
501: Imaging section
503: Video coding section
504: Audio input section
505: Audio coding section
506: Multiplexing section
507: Communication section
508: Video decoding section
509: Image processing section
510: Display section
511: Audio decoding section
512: Audio output section
513: Control section
600: Information processing device (video reproducing device)
601: Communication section
602: Demultiplexing section (DMUX)
603: Audio decoding section
604: Audio output section
605: Video decoding section
606: Display section
607: Sound collection section
608: Audio coding section
609: Sensor section
610: Control section

The invention claimed is:

1. An information processing device comprising:
a receiving section that receives a three-dimensional image;
a storage section that retains a three-dimensional model for mapping the three-dimensional image onto a two-dimensional image;
a transmission section that transmits the two- dimensional image; and
a control section, wherein
the control section determines the three-dimensional model to be used on a basis of a user's instruction or a surrounding environment, maps the three-dimensional image onto the two-dimensional image on a basis of the determined three-dimensional model, and transmits the two-dimensional image to the transmission section,
the receiving section receives a whole-sky video as the three-dimensional image,
the control section exercises switchover control over a shape onto which the whole-sky video is mapped among a plurality of three-dimensional models including at least one of a cylinder, a cube, a quadrangular pyramid, or a shape of a subject,
the receiving section receives a first signal from a first device that captures the whole-sky video, and
the control section exercises the switchover control on a basis of information contained in the first signal.

2. The information processing device according to claim 1, wherein
the control section exercises the switchover control in response to a user's instruction contained in the first signal.

3. The information processing device according to claim 1, wherein
the control section exercises the switchover control in response to information indicating a circumstance during capturing and contained in the first signal.

4. The information processing device according to claim 1, wherein
the control section switches over to mapping using the quadrangular pyramid with a bottom surface thereof facing the subject on a basis of information associated with the subject and contained in the first signal.

5. An information processing device comprising:
a receiving section that receives a three-dimensional image;
a storage section that retains a three-dimensional model for mapping the three-dimensional image onto a two-dimensional image;
a transmission section that transmits the two-dimensional image; and
a control section, wherein
the control section determines the three-dimensional model to be used on a basis of a user's instruction or a surrounding environment, maps the three-dimensional image onto the two-dimensional image on a basis of the determined three-dimensional model, and transmits the two-dimensional image to the transmission section,
the receiving section receives a whole-sky video as the three-dimensional image,
the control section exercises switchover control over a shape onto which the whole-sky video is mapped among a plurality of three-dimensional models including at least one of a cylinder, a cube, a quadrangular pyramid, or a shape of a subject,
the transmission section transmits the two-dimensional image onto which the whole-sky video is mapped to a second device, and
the control section exercises the switchover control on a basis of information contained in a second signal received from the second device.

6. The information processing device according to claim 5, wherein
the control section exercises the switchover control on a basis of information associated with the subject and contained in the second signal.

7. The information processing device according to claim 6, wherein
the control section switches over to mapping using the quadrangular pyramid with a bottom surface thereof facing the subject.

8. The information processing device according to claim 5, wherein
the control section switches over to mapping using the quadrangular pyramid with a bottom surface thereof facing a direction of a visual line on a basis of visual line information contained in the second signal.

9. The information processing device according to claim 5, wherein
the control section exercises the switchover control in response to a user's instruction contained in the second signal.

10. An information processing device comprising:
a receiving section that receives a three-dimensional image;
a storage section that retains a three-dimensional model for mapping the three-dimensional image onto a two-dimensional image;
a transmission section that transmits the two-dimensional image; and
a control section, wherein
the control section determines the three-dimensional model to be used on a basis of a user's instruction or a surrounding environment, maps the three-dimensional image onto the two-dimensional image on a basis of the determined three-dimensional model, and transmits the two-dimensional image to the transmission section,
the receiving section receives a whole-sky video as the three-dimensional image,
the control section exercises switchover control over a shape onto which the whole-sky video is mapped among a plurality of three-dimensional models including at least one of a cylinder, a cube, a quadrangular pyramid, or a shape of a subject,
the transmission section transmits the whole-sky video to a plurality of second devices, and
the control section exercises the switchover control on a basis of visual line information contained in the second signal received from each of the plurality of second devices.

11. The information processing device according to claim 10, wherein
the control section exercises control to unicast the two-dimensional image onto which the whole-sky video is mapped using the quadrangular pyramid with a bottom surface thereof facing a direction of a visual line of each of the plurality of second devices to each of the plurality of second devices.

12. The information processing device according to claim 10, wherein
the control section exercises control to multicast the two-dimensional image onto which the whole-sky video is mapped using the quadrangular pyramid with a bottom surface thereof facing a region including a majority of a visual line.

13. An information processing device comprising:
a receiving section that receives a three-dimensional image;
a storage section that retains a three-dimensional model for mapping the three-dimensional image onto a two-dimensional image;
a transmission section that transmits the two-dimensional image; and
a control section, wherein
the control section determines the three-dimensional model to be used on a basis of a user's instruction or a surrounding environment, maps the three-dimensional image onto the two-dimensional image on a basis of the determined three-dimensional model, and transmits the two-dimensional image to the transmission section,
the receiving section receives a whole-sky video as the three-dimensional image, and
the control section exercises switchover control over a shape onto which the whole-sky video is mapped among a plurality of three-dimensional models including at least one of a cylinder, a cube, a quadrangular pyramid, or a shape of a subject,
further comprising:
a monitoring section that monitors a circumstance of a channel for transmitting the whole-sky video, wherein
the control section exercises the switchover control on a basis of the circumstance of the channel.

* * * * *